(12) United States Patent
Ye

(10) Patent No.: US 10,346,464 B2
(45) Date of Patent: Jul. 9, 2019

(54) CROSS-MODIALITY IMAGE MATCHING METHOD

(71) Applicant: CANON KABUSHIKI KAISHA, Tokyo (JP)

(72) Inventor: Getian Ye, Kogarah (AU)

(73) Assignee: Canon Kabushiki Kaisha, Tokyo (JP)

( * ) Notice: Subject to any disclaimer, the term of this patent is extended or adjusted under 35 U.S.C. 154(b) by 206 days.

(21) Appl. No.: 15/277,211

(22) Filed: Sep. 27, 2016

(65) Prior Publication Data

US 2018/0089534 A1    Mar. 29, 2018

(51) Int. Cl.
| G06K 9/00 | (2006.01) |
| G06K 9/20 | (2006.01) |
| G06F 16/583 | (2019.01) |

(52) U.S. Cl.
CPC ..... *G06F 16/5838* (2019.01); *G06K 9/00295* (2013.01); *G06K 9/00771* (2013.01); *G06K 9/2018* (2013.01)

(58) Field of Classification Search
None
See application file for complete search history.

(56) References Cited

U.S. PATENT DOCUMENTS

| 6,920,236 | B2 | 7/2005 | Prokoski | |
| 9,483,701 | B1* | 11/2016 | Kwatra | G06K 9/3241 |
| 2004/0073543 | A1* | 4/2004 | Kim | G06F 17/30247 |
| 2005/0129290 | A1* | 6/2005 | Lo | G06K 9/00067 |
| | | | | 382/124 |
| 2006/0115176 | A1* | 6/2006 | Kanamori | G06T 5/003 |
| | | | | 382/266 |
| 2006/0143176 | A1* | 6/2006 | Mojsilovic | G06F 19/321 |
| 2010/0328452 | A1* | 12/2010 | Jung | G06K 9/6206 |
| | | | | 348/135 |
| 2010/0332475 | A1* | 12/2010 | Birdwell | G06F 17/30333 |
| | | | | 707/737 |
| 2011/0128362 | A1 | 6/2011 | Shi | |
| 2012/0143856 | A1* | 6/2012 | Klinkigt | G06K 9/4671 |
| | | | | 707/723 |

(Continued)

OTHER PUBLICATIONS

M. Saquib Sarfraz, et al. "Deep Perceptual Mapping for Thermal to Visible Face Recognition." (2015). pp. 1-13. CoRR 2015, abs/1507.02879. International Journal of Computer Vision.

(Continued)

*Primary Examiner* — Kevin Ky
(74) *Attorney, Agent, or Firm* — Canon U.S.A., Inc. IP Division

(57) ABSTRACT

A computer-implementable method for determining a score for matching images includes extracting and determining. Features are extracted from each of a query image acquired in a first modality and a database image acquired in a second modality. A vector distance distribution is determined based on a codebook for the first modality for each of the query image and the database image represented by the extracted features. The method determines a set of distances between the vector distance distribution determined for the query image and the vector distance distribution determined for the database image. The score for matching the query image and the database image is determined based on the determined set of distances.

21 Claims, 16 Drawing Sheets

(56) References Cited

U.S. PATENT DOCUMENTS

| | | | | |
|---|---|---|---|---|
| 2013/0114856 | A1* | 5/2013 | Jung | G06K 9/6206 |
| | | | | 382/103 |
| 2014/0153832 | A1* | 6/2014 | Kwatra | G06T 11/00 |
| | | | | 382/195 |
| 2015/0235073 | A1* | 8/2015 | Hua | G06K 9/00288 |
| | | | | 382/118 |
| 2015/0379253 | A1* | 12/2015 | Cook | G06F 21/32 |
| | | | | 726/19 |
| 2016/0078283 | A1* | 3/2016 | Hwang | G06K 9/00288 |
| | | | | 382/118 |
| 2016/0210975 | A1* | 7/2016 | Vasilache | H04N 19/124 |
| 2017/0262695 | A1* | 9/2017 | Ahmed | G06K 9/00288 |
| 2018/0075318 | A1* | 3/2018 | Chu | G06K 9/481 |

OTHER PUBLICATIONS

Reale, Christopher, et al, "Coupled Dictionaries for Thermal to Visible Face Recognition." (Oct. 2014). pp. 328-332. IEEE International Conference on Image Processing (ICIP). Paris, France.

Simonyan, K., et al. "Fisher Vector Faces in the Wild." (Sep. 2013.) pp. 100-106. British Machine Vision Conference (BMVC). Bristol, UK.

M. Saquib Sarfraz, et al. "Deep Perceptual Mapping for Thermal to Visible Face Recognition", International Journal of Computer Vision, Jul. 10, 2015, pp. 1-11, CoRR 2015, abs/1507.02879, arxiv.org/abs/1507.02879, Cornell University, Ithaca, New York, U.S.

* cited by examiner

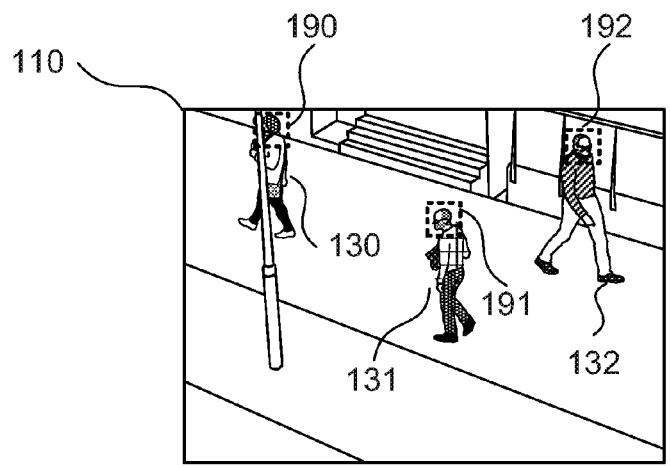
Fig. 1B(1)
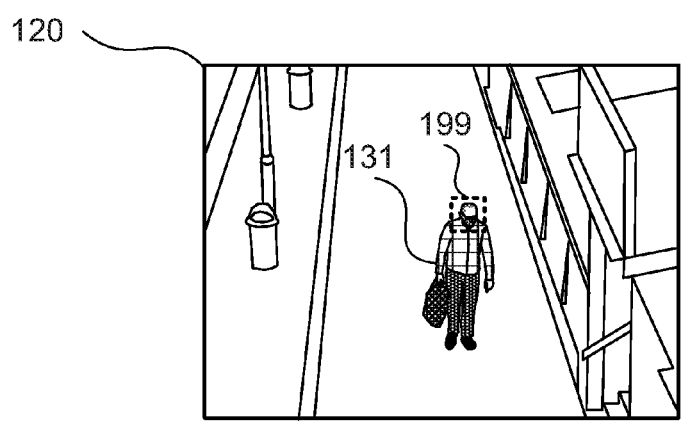
Fig. 1B(2)
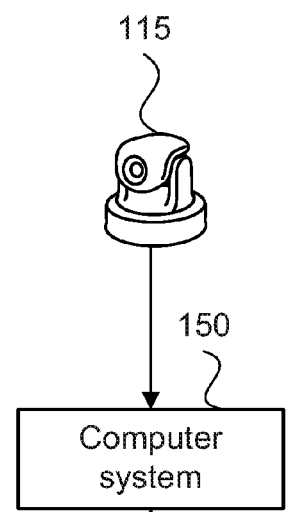
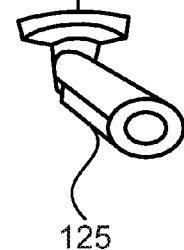
Fig. 1B(3)

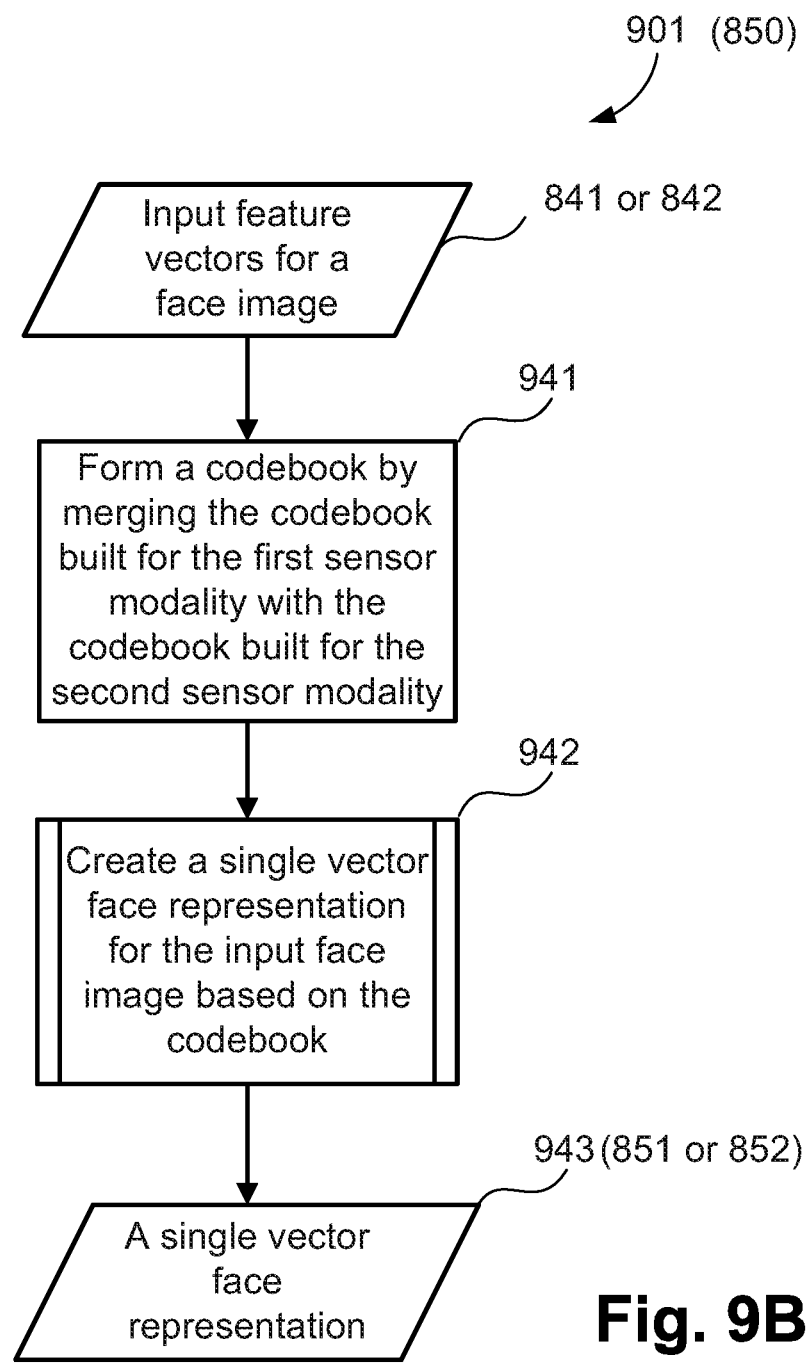

CROSS-MODALITY IMAGE MATCHING METHOD

TECHNICAL FIELD

The present invention relates generally to image and video processing and, in particular, to a system and method for matching images captured using two different sensor modalities.

BACKGROUND

Public venues such as shopping centres, parking lots and train stations are increasingly subjected to surveillance with large-scale networks of video cameras. Application domains of large-scale video surveillance include security, safety, traffic management and business analytics. One of the key tasks in the application of large-scale video surveillance is face verification, that is to match faces captured by different cameras at different times and locations. Face verification is often required to match faces in different viewpoints or in different poses as cameras at different locations often have different view angles or persons appearing in the camera field of view may have different head poses. Matching faces from different camera viewpoints or in difference poses is difficult. Face verification systems are generally developed for visible-to-visible face verification, which matches faces captured by visible cameras. A visible camera usually forms an image using visible light (between 0.35 µm and 0.74 µm wavelength range) with a charge coupled device (CCD) or a CMOS sensor. A visible image often has three colour channels. The image quality of a visible camera is heavily dependent on the illumination condition of the scene being imaged. A visible camera may fail to produce a good quality image under an environment lacking in illumination or without any illumination.

Cross-modality face verification matches faces captured by different sensor modalities at different times and locations. One example is thermal-to-visible face verification, that is to match a face captured by a visible camera to a face captured by a thermal infrared (IR) camera. A thermal infrared camera forms an image using infrared radiation (between 3 µm and 14 µm wavelength range). A thermal infrared image has a single channel indicating the temperature distribution of the scene being imaged. A thermal infrared camera is able to work in a completely dark environment without any dependence on the amount of ambient light being present. Another example is depth-to-visible face verification that is used to match a face captured by a visible camera to a face captured by a range imaging camera, which produces depth information on the scene being imaged. A time-of-flight (ToF) camera is a type of range imaging camera and produces depth information by measuring the time-of-flight of a light signal between the camera and the scene being imaged based on the known speed of light. The image quality of a range imaging camera does not depend on illumination conditions. One application scenario of cross-modality face verification is a network of surveillance cameras with non-overlapping fields of view in a wide area installation such as airport or train station. A person has performed a suspicious act such as leaving an unattended bag in the darkness, where only a thermal infrared camera or a time-of-flight camera is able to detect the person's face. The thermal infrared face image or depth face image is used as a query to find this person in the views of visible cameras in the camera network. Compared to visible-to-visible face verification, cross-modality face verification is more challenging due to the large modality gap or very different sensor characteristics between different sensor modalities and different viewpoints or poses of faces. Moreover, a thermal infrared image or a depth image is usually of considerably lower resolution than a visible image. Such resolution gap makes cross-modality face verification even more challenging for matching faces.

One image processing method for thermal-to-visible face verification uses a partial least-squares discriminant analysis for modelling the modality difference in a latent space where the correlation between features extracted from thermal face images and visible face images are maximised.

Another image processing method for thermal-to-visible face verification learns two dictionaries, each dictionary containing numerous basis atoms and providing a sparse representation for features extracted from a sensor modality. Each feature vector extracted from a sensor modality can be compactly represented as a weighted linear combination of basis atoms from a dictionary. The relationship between two sensor modalities is modelled by the difference between the weights for one dictionary and the weights for the other dictionary in dictionary learning.

In another image processing method for thermal-to-visible face verification, a feed-forward deep neural network is used to directly learn a non-linear mapping between two sensor modalities to bridge the modality gap while preserving the identity information. The objective function for finding the non-linear mapping is designed to minimize the perceptual difference between visible and thermal face images in the least mean square sense. The input to the deep neural network is an image captured by one sensor modality while the output of the deep neural network is an image captured by the other sensor modality.

The above-mentioned image processing methods require face alignment to geometrically transform all the face images captured by different sensor modalities to a canonical frontal representation based on numerous facial landmarks located on the eyes, nose, and lips. The performance of automatic landmark localisation in visible face images is often dependent on the poses of faces and illumination conditions. If a pose of a face is very different from the frontal representation or the illumination is low in a visible face image, landmark localisation may produce erroneous facial landmarks. Automatic landmark localisation often cannot perform well on thermal face images mainly because some facial regions such as eyes and lips on a person's face may have approximately the same temperature distribution. These facial regions may have approximately the same intensity in the thermal face image so that facial landmarks detected in these facial regions are often inaccurate. Inaccurate facial landmarks introduce errors in transformed face images in the canonical frontal representation and consequently deteriorate the performance of face verification.

A need exists to address problems relating to matching objects using different camera modalities and/or poses.

SUMMARY

It is an object of the present invention to substantially overcome, or at least ameliorate, one or more disadvantages of existing arrangements.

One aspect of the present disclosure provides a computer-implementable method for determining a score for matching images, where the method includes extracting features from each of a query image acquired in a first modality and a database image acquired in a second modality, determining a vector distance distribution based on a codebook for the first modality for each of the query image and the database image represented by the extracted features, determining a set of distances between the vector distance distribution determined for the query image and the vector distance distribution determined for the database image, and determining the score for matching the query image and the database image based on the determined set of distances.

Another aspect of the present disclosure provides a computer-implementable method for matching images, comprising: extracting features from each of a query image acquired in a first modality and a database image acquired in a second modality, each of the query image and the database image being a face image; determining a first vector distance distribution based on a codebook for the first modality and a second vector distance distribution based on a codebook for the second modality, the first and second vector distance distributions being for each of the query image and the database image represented by the features respectively; determining a first set of distances between the determined first vector distance distributions for the query image and the database image; determining a second set of distances between the determined second vector distance distributions for the query image and the database image; determining a score based on the first set of distances and the second set of distances; and matching the query image to the database image using the determined score.

Another aspect of the present disclosure provides a camera, comprising: a sensor configured to capture a query image using a first modality; a processor; and a memory, the memory having instructions thereon executable by the processor to: extract features from each of the query image and a database image acquired in a second modality; determine a vector distance distribution based on a codebook for the first modality for each of the query image and the database image represented by the extracted features; determine a set of distances between the vector distance distribution determined for the query image and the vector distance distribution determined for the database image; determine a score for matching the query and database images based on the set of distances; and transmit information related to the score via a network.

Another aspect of the present disclosure provides a non-transitory computer readable storage medium having a computer program stored thereon for determining a score for matching images, comprising: code for extracting features from each of a query image acquired in a first modality and a database image acquired in a second modality; code for determining a vector distance distribution based on a codebook for the first modality for each of the query image and the database image represented by the extracted features; code for determining a set of distances between the vector distance distribution determined for the query image and the vector distance distribution determined for the database image; and code for determining the score for matching the query image and the database image based on the first set of distances.

Another aspect of the present disclosure provides a system, comprising: an image capture device configured to capture a query image using a first modality; a database comprising database images captured using a second modality; a processor; and a memory, the memory having instructions thereon executable by the processor to: extract features from each of the query image and one of the database images; determine a vector distance distribution based on a codebook for the first modality for each of the query image and the database image represented by the extracted features; determine a set of distances between the vector distance distribution determined for the query image and the vector distance distribution determined for the database image; and determine a score for matching the query and database images based on the set of distances.

Other aspects are also disclosed.

BRIEF DESCRIPTION OF THE DRAWINGS

One or more embodiments of the invention will now be described with reference to the following drawings, in which:

FIGS. 1B(1)-1B(3) are schematic diagrams illustrating scenes captured in fields of view of two cameras monitoring the city area shown in FIG. 1A;

FIG. 9A, FIG. 9B, and FIG. 9C are each a schematic flow diagram showing a method of creating vector representations for a face image, as executed in the method of FIG. 8;

DETAILED DESCRIPTION INCLUDING BEST MODE

Figure 1A:
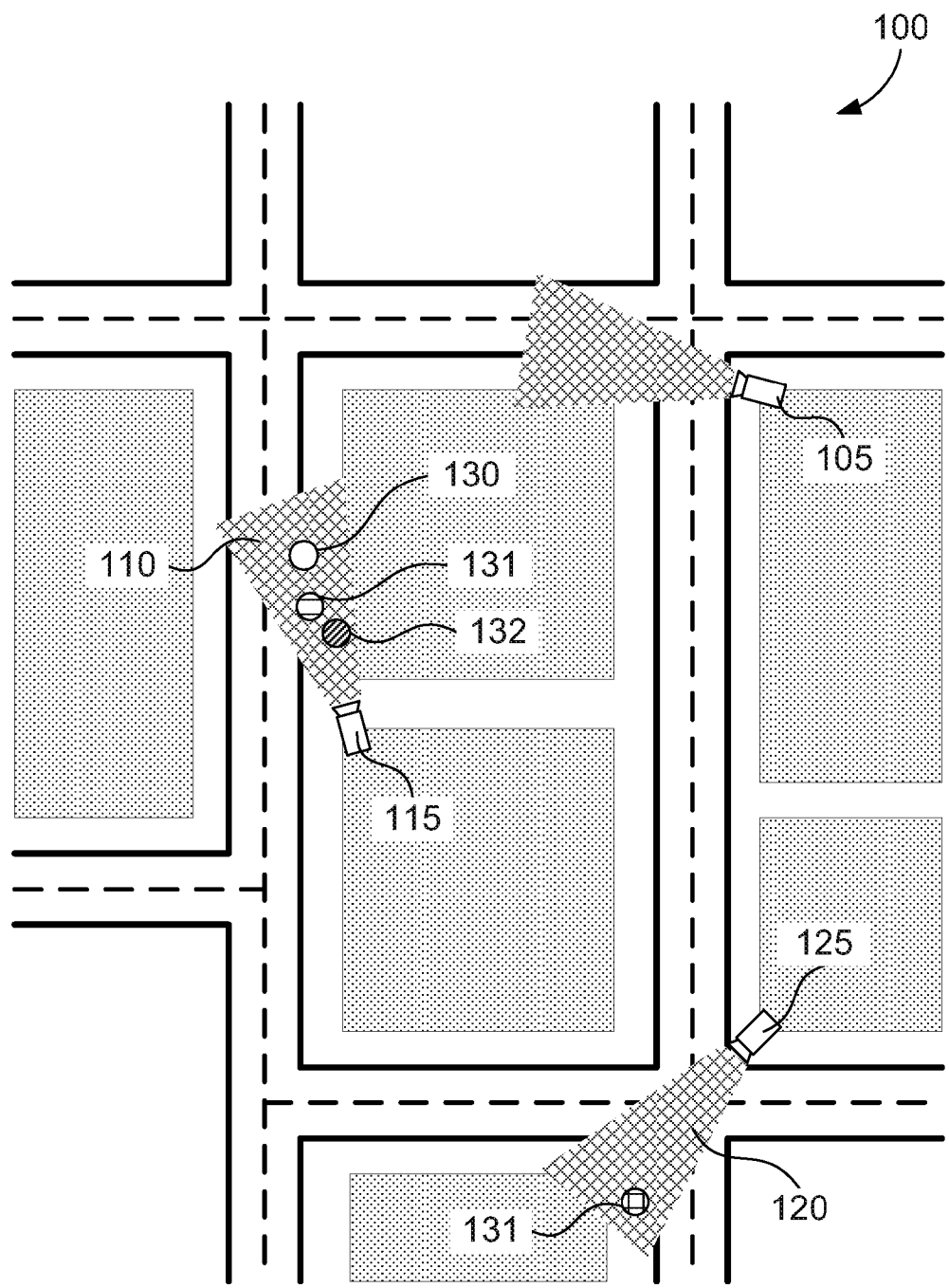
FIG. 1A is a schematic diagram illustrating a top-down view of a surveillance camera network monitoring a city area.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and the section above relating to prior art arrangements relate to discussions of documents or devices which may form public knowledge through their respective publication and/or use. Such discussions should not be interpreted as a representation by the present inventors or the patent applicant that such documents or devices in any way form part of the common general knowledge in the art.

As discussed above, a need has been identified to avoid problems of facial landmark localisation and face alignment in matching images captured using different sensor modalities. There is a need for an alignment-free cross-modality face verification method that is able to match face images in different sensor modalities and poses accurately without using any facial landmarks and geometric transformation.

The present disclosure provides a method, system and apparatus for matching faces captured by two different sensor modalities without using any facial landmarks and face alignment. The simplified diagram in FIG. 1A shows a top-down view of an exemplary use case to which embodiments of the present disclosure may be applied. In the example of FIG. 1A, a city area 100 is monitored by a network of cameras 105, 115, 125. A field of view (FOV) 110 of the camera 115, a visible camera, encapsulates three moving targets 130, 131 and 132 at a time instant. A field of view 120 of the camera 125 encapsulates the moving target 131 at another time instant. The camera 125 has a different sensor modality from the camera 115. The sensor modality of the camera 125 is referred to as a first sensor modality and the sensor modality of the camera 115 is referred to as a second sensor modality. For example, the camera 125 may be a thermal infrared camera or a time-of-flight (ToF) camera. The camera 125 and the camera 115 have no overlapping field of view. Cameras 115 and 125 capture a common target 131, albeit at different times. The arrangements described relate to an example of matching the faces of moving targets across cameras such as the target 131 moving across the cameras 115 and 125.

Scenes of the field of view captured by each of the cameras 115 and 125 are further illustrated in FIGS. 1B(1) and 1B(2). The cameras 115 and 125 capture different street scenes in the city area 100 at different locations in different view angles. At a time instant, the three moving targets 130, 131, and 132 appear in the field of view of camera 115, as shown by a scene 110 of FIG. 1B(1). The faces of the three moving targets 130, 131 and 132 are detected by execution of a face detection method. One example of a method of face detection uses mixtures of deformable part models where a facial region is modelled as a part and global mixtures are used to capture topological changes due to the pose or viewpoint. A part is only visible in certain mixtures and different mixtures are allowed to share part templates. Other example methods of face detection include a Viola-Jones face detection method and deep convolutional neural network-based methods. Face images 190, 191, and 192 of the three moving targets 130, 131 and 132 are stored in a database. Each face image stored in the database is referred to as a database image.

At another time instant, for example, 2 days later, the target 131 appears in the field of view of the camera 125 that has a different sensor modality from the camera 115 as shown in a scene 120 of FIG. 1B(2). The face of target 131 is detected by the face detection method. Face verification is used to determine if the face of the target 131 appeared in the FOV of camera 115 before and uses a face image 199 as a query image to match against each of the database face images 190, 191, and 192 captured by the camera 115. The query image 199 and each of the database images 190, 191 and 192 differ in the sensor modality and viewpoint or pose. After determining distances or scores between the query image 199 acquired in the first sensor modality and each of the database images 190, 191 and 192 acquired in the second sensor modality, the database images 190, 191, and 192 may be arranged by sorting the distances in an ascending order. The database image that is closest to the query image 199 is considered as a match in some arrangements.

The captured images of the scenes 110 and 120 are made up of visual elements. The terms "pixel", "pixel location" and "image location" refer to one of the visual elements in a captured image. Each pixel of an image is described by one value characterising a property of the scene captured in the image. In one example, a single intensity value in a visible image captured by the camera 115 characterises a brightness of the scene at the pixel location. A single intensity value in a thermal infrared (IR) image captured by the thermal infrared camera 125 characterises a temperature distribution of the scene at the pixel location. In another example, a pixel of a visible image captured by the visible camera 115 has an associated triplet of values that characterise the colour of the scene at the pixel location. The three values have normally been converted to a single value using a colour transformation method.

Furthermore, a "region", "image region", or "image patch" in an image refers to a collection of one or more spatially adjacent visual elements. The appearance and shape of an image region is often characterised by a feature descriptor extracted from the image region. A feature descriptor may be a histogram of image gradient orientations. Scale invariant feature transform (SIFT) feature descriptor and histogram of oriented gradients (HoG) feature descriptor are commonly used feature descriptors. A feature descriptor is often represented by a multi-dimensional vector called feature vector. A codebook is a model describing groups of image regions, each of which is characterised by a feature vector, and each group has a similar appearance and shape. A codebook is comprised of numerous codewords and each codeword represents a group of image regions having a similar appearance and shape.

As illustrated in FIG. 1B(3), the cameras 115 and 125 communicate with a computer system 150, for example a server computer. The cameras 115 and 125 may be in wired or wireless communication with the computer system 150. The exemplary arrangement of FIG. 1B(3) can be applied to a range of applications. In one example, the computer system 150 automatically detects the face of the target of interest and matches the faces detected from other cameras in the camera network in order to analyse the long-term behaviour of the target of interest. In another example, the computer system 150 allows a security guard to select the face of the target of interest through an interactive user interface, and returns images of one or more candidates determined to be the target of interest. The computer system 150 typically functions in a similar manner to the cameras 115 and 125, as described in relation to FIGS. 2A and 2B, albeit with increased processing capacity.

Figure 2A:
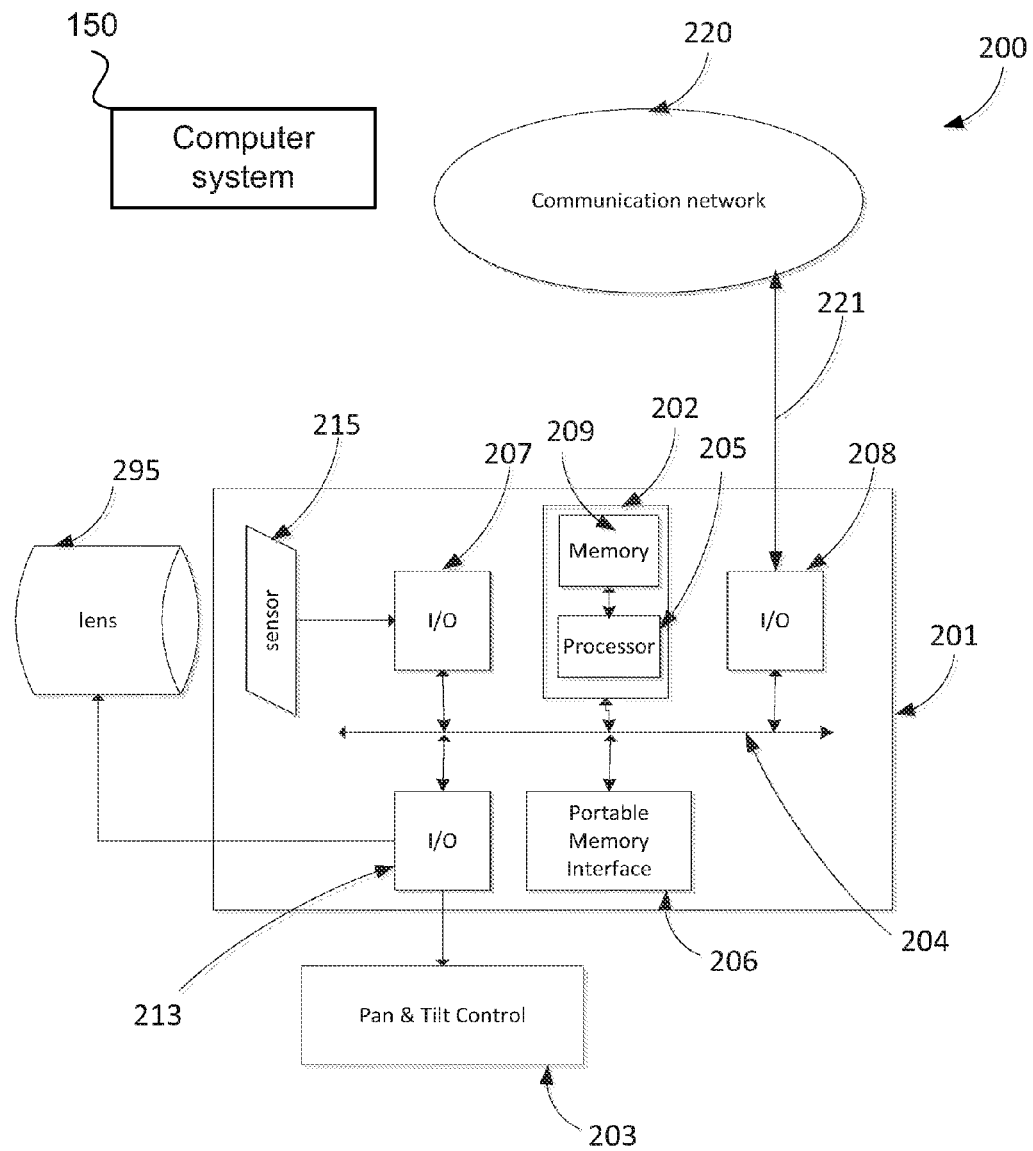
FIGS. 2A and 2B form a schematic block diagram of a camera, upon which described methods may be practiced.
Figure 2B:
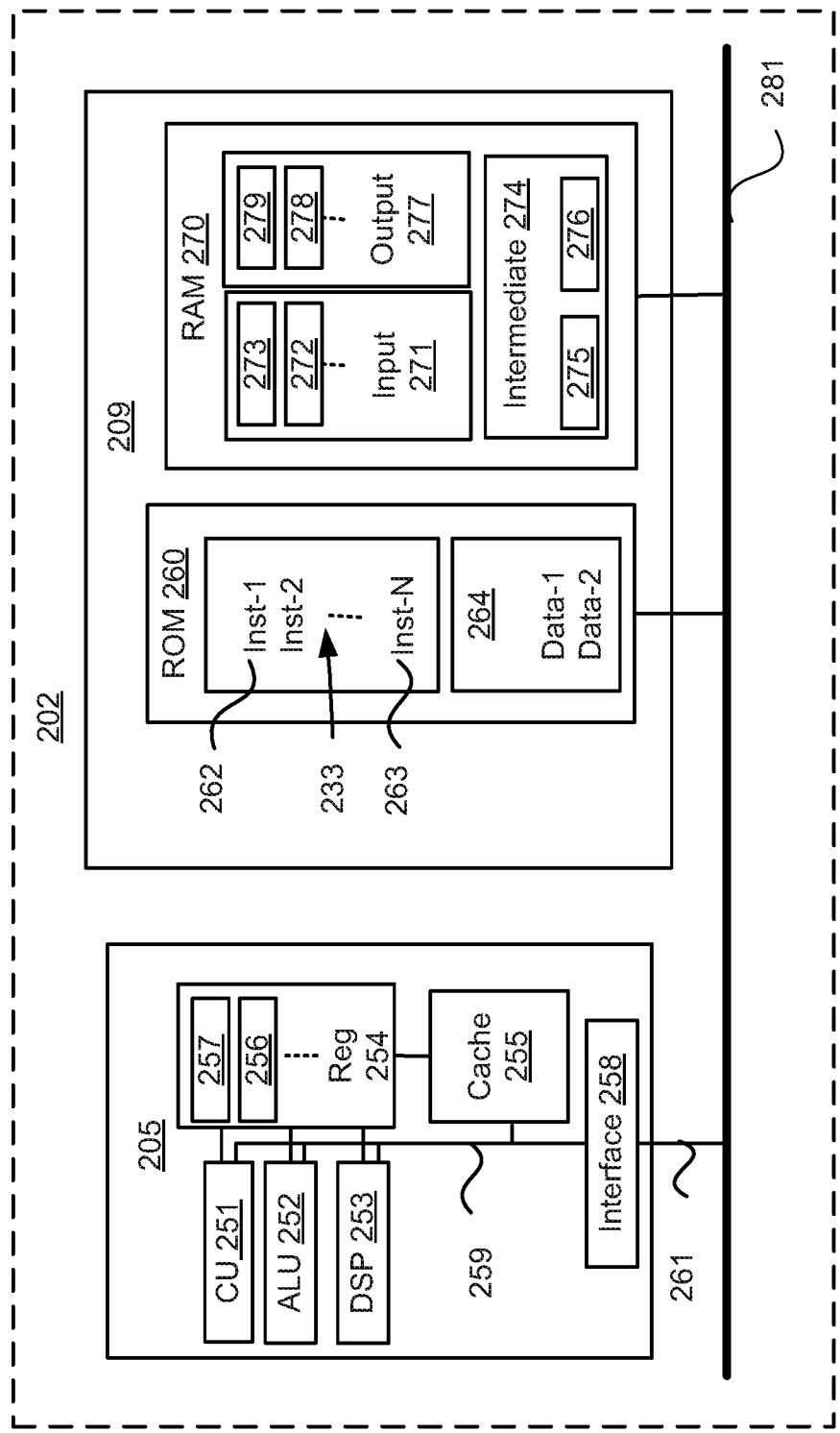

FIGS. 2A and 2B are a schematic block diagram of an image capture device 200, in the example of FIGS. 2A and 2B a digital camera such as a still camera or a video camera, upon which the described methods may be practiced. In the arrangements described the camera 200 relates to the camera 125. The camera 115 operates in a similar manner. The camera 200 is a pan-tilt-zoom camera (PTZ) and may be used to implement any one of the cameras 105, 115 and 125. The camera 200 comprises a camera module 201, a pan and tilt module 203, and a lens system 295.

The methods of determining a score for matching an image and the methods for matching an image described herein are implemented on the camera 200 in the description below. However, the arrangements described may also be implemented on a computing device such as the computer 150. In such arrangements, the computing device receives and stores images captured using different sensor modalities.

As seen in FIG. 2A, the camera module 201 comprises an embedded controller 202. Accordingly, the electronic device 201 may be referred to as an "embedded device." In the example of FIG. 2A, the embedded controller 202 includes at least one processor unit 205 (or processor) which is bi-directionally coupled to an internal storage module 209. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

As seen in FIG. 2A, the camera module 201 also comprises a portable memory interface 206 which is coupled to the processor 205. The portable memory interface 206 allows a complementary portable memory device to be coupled to the camera module 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera module 201 also comprises an input/output (I/O) interface 207 that couples to a photo-sensitive sensor array 215. The sensor array 215 can be any sensor array suitable for image capture. In the arrangements described, the sensor array 215 is an infrared light sensor array. In other arrangements, the sensor array 215 is a visible light sensor or a sensor for a time-of-flight camera.

The camera module 201 also comprises a communications input/output (I/O) interface 208 that couples to a communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like. The camera module 201 can communicate with devices or systems such as the computer system 150 via the network 220.

The camera module 201 also comprises an I/O interface 213 for the pan and tilt module 203 and the lens system 295.

The components, which include the sensor I/O interface 207, embedded controller 202, communications I/O interface 208, control interface 213 and memory 206 of the camera module 201, typically communicate via an interconnected bus 204 and in a manner which results in a conventional mode of operation known to those in the relevant art.

The described methods may be implemented using the embedded controller 202, where the processes of FIGS. 3-11 may be implemented as one or more software application programs 233 (FIG. 2B) executable within the embedded controller 202. The camera module 201 of FIG. 2A implements the described methods. In particular, with reference to FIG. 2B, the steps of the described methods are effected by instructions in the software 233 that are carried out within the controller 202. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 233 of the embedded controller 202 is typically stored in the non-volatile ROM 260 of the internal storage module 209. The software 233 stored in the ROM 260 can be updated when required from a computer readable medium. The software 233 can be loaded into and executed by the processor 205. In some instances, the processor 205 may execute software instructions that are located in RAM 270. Software instructions may be loaded into the RAM 270 by the processor 205 initiating a copy of one or more code modules from ROM 260 into RAM 270. Alternatively, the software instructions of one or more code modules may be pre-installed in a non-volatile region of RAM 270 by a manufacturer. After one or more code modules have been located in RAM 270, the processor 205 may execute software instructions of the one or more code modules.

The application program 233 is typically pre-installed and stored in the ROM 260 by a manufacturer, prior to distribution of the camera module 201. However, in some instances, the application programs 233 may be supplied to the user encoded on one or more external storage devices (not shown) and read via the portable memory interface 206 of FIG. 2A prior to storage in the internal storage module 209 or in the portable memory as described above. In another alternative, the software application program 233 may be read by the processor 205 from the network 220, or loaded into the controller 202 or such portable storage medium from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera module 201. Examples of transitory or non-tangible computer readable transmission media that may also participate in the provision of software, application programs, instructions and/or data to the camera module 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

FIG. 2B illustrates in detail the embedded controller 202 having the processor 205 for executing the application programs 233 and the internal storage 209. The internal storage 209 comprises read only memory (ROM) 260 and random access memory (RAM) 270. The processor 205 is able to execute the application programs 233 stored in one or both of the connected memories 260 and 270. When the camera module 201 is initially powered up, a system program resident in the ROM 260 is executed. The application program 233 permanently stored in the ROM 260 is sometimes referred to as "firmware". Execution of the firmware 233 by the processor 205 may fulfil various functions, including processor management, memory management, device management, storage management and user interface.

The processor 205 typically includes a number of functional modules including a control unit (CU) 251, an arithmetic logic unit (ALU) 252, a digital signal processing (DSP) unit 253 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The application program 233 includes a sequence of instructions 262 through 263 that may include conditional branch and loop instructions. The program 233 may also include data, which is used in execution of the program 233. This data may be stored as part of the instruction or in a separate location 264 within the ROM 260 or RAM 270.

In general, the processor 205 is given a set of instructions, which are executed therein. The set of instructions may be organised into blocks, which perform specific tasks or handle specific events that occur in the camera module 201. Typically, the application program 233 waits for events and subsequently executes the block of code associated with that event. Events may be triggered in response to input from the interfaces 207, 208 and 213 of the camera module 201.

The execution of a set of the instructions may require numeric variables to be read and modified. Such numeric variables are stored in the RAM 270. The described methods use input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 233, and is performed by repeated execution of a fetch-execute cycle in the processor 205 or similar programmatic operation of other independent processor blocks in the camera module 201. The camera 200 may be used to capture input images representing the visual content of a scene appearing in the field of view of the camera 200. The visual content may include one or more foreground objects and one or more background objects.

The camera 200 is used to capture video frames representing visual content of a scene appearing in the field of view of the camera 200. Each video frame is an image captured by the camera 200. The described methods may be configured for extracting foreground objects and matching objects across frames from different cameras. The foreground objects may also be referred to as "targets" or "query objects". Although the camera 200 is described as a pan tilt zoom camera, the described methods may be implemented as a computer program executing on any type of camera including for example static field-of-view cameras, wearable cameras, handheld cameras and the like.

In the arrangements described below, methods of matching images or determining scores of matching images are executed on the camera module 201. In other arrangements, the methods described may be executed on another device separate to the module 201, for example on the computer 150.

A face verification system is typically comprised of two stages: a learning stage and a prediction stage. Execution of the learning stage builds a model for representing faces using a set of training face images. The learning stage is usually performed before the system deployment. The prediction stage is performed after the system deployment. During execution of the prediction stage, the model learned from the learning stage is used to represent faces to be matched and the scores between faces are determined using the face representations created based on the learned model. A score measures the similarity or distance between faces.

Figure 3A:
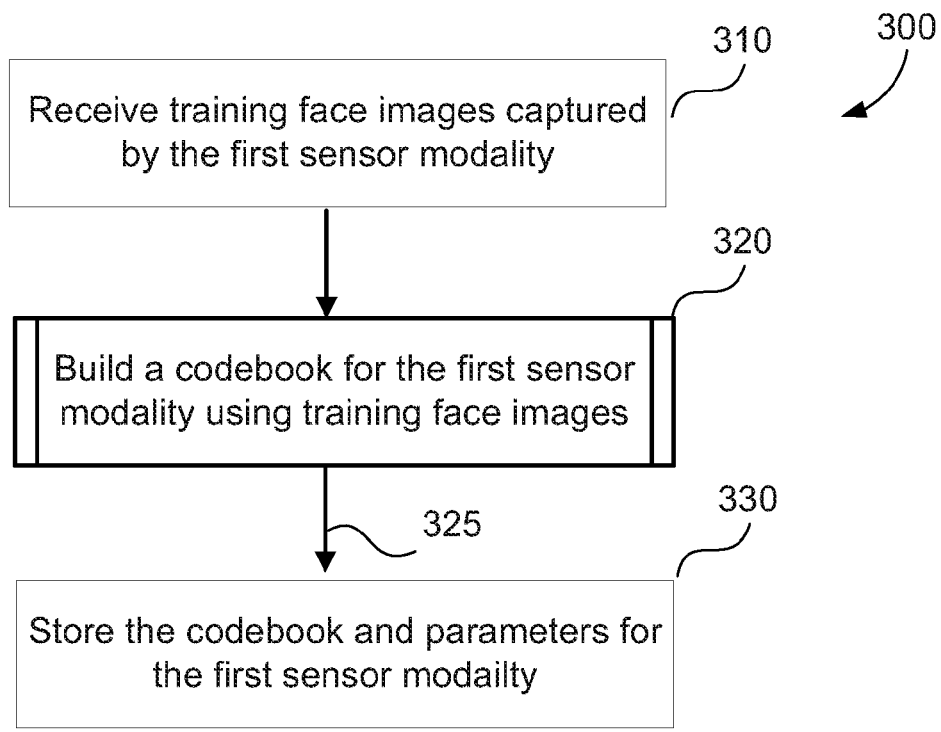
FIGS. 3A and 3B are schematic flow diagrams illustrating the learning stages of building two codebooks, each codebook being for a different sensor modality.

FIG. 3A shows a schematic flow diagram illustrating a method 300 of building a codebook using a set of training face images captured by a first sensor modality, for example, the thermal infrared camera 125. The method 300 is typically implemented at the learning stage. The method 300 is typically implemented as one or more modules of the application 233 stored in the memory 209 and executed under control of the processor 205. The method 300 begins at a step 310. At execution of step 310, training face images captured using the first sensor modality are received. In the arrangements described, the images received at step 310 are received via the sensor array 215. In other implementations, the images received at step 310 are received from an external image capture device. The method 300 continues under execution of the processor 205 to a step 320. A codebook is built for the first sensor modality using the received training face images at step 320. The method 300 continues to a step 330. The learned codebook and parameters 325 generated in the learning stage are stored at step 330, for example in the memory 209, after the learning stage finishes.

Figure 3B:
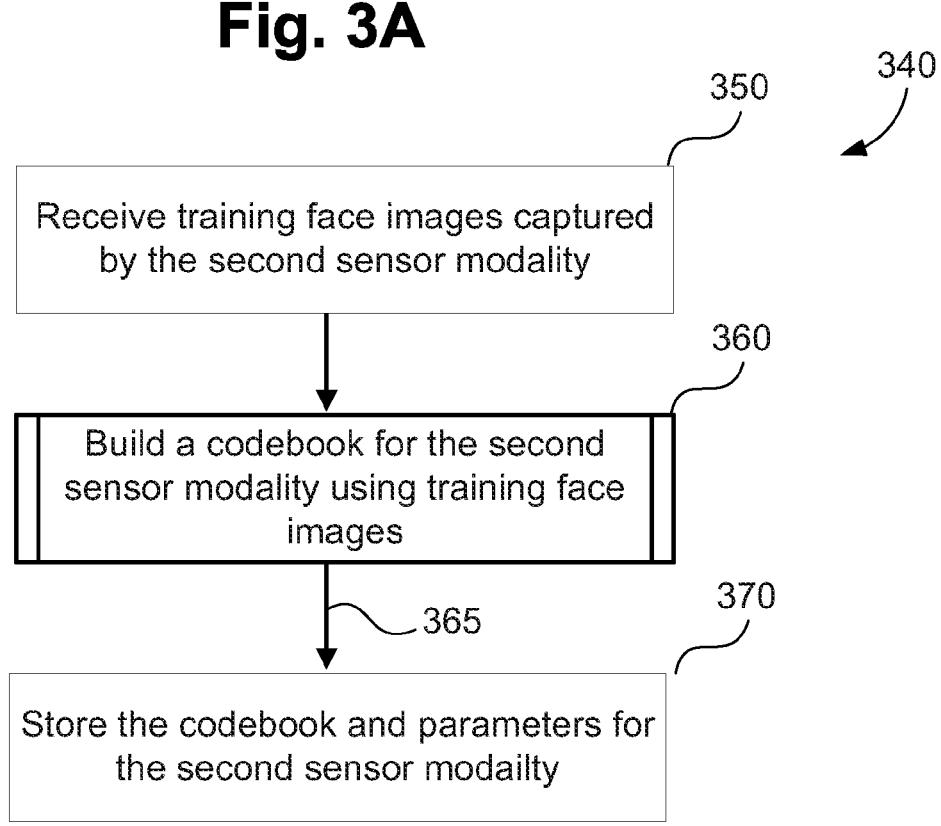

FIG. 3B shows a schematic flow diagram illustrating a method 340 for the learning stage of building a codebook using a set of training face images captured by a second sensor modality, for example, a visible camera. The method 340 is typically implemented as one or more modules of the application 233 stored in the memory 209 and executed under control of the processor 205. The method 340 begins at a step 350. In execution of the step 350 training face images captured using the second sensor modality are received. In the arrangements described, the images received at step 350 are received from a separate camera of the second sensor modality type, or from a database of images captured using the second sensor modality. The method 340 continues to a step 360. A codebook is built for the second sensor modality using the received training face images at step 360. The method 340 continues to a step 370. The learned codebook and parameters 365 generated in the learning stage are stored at step 370 after the learning stage finishes.

Figure 4:
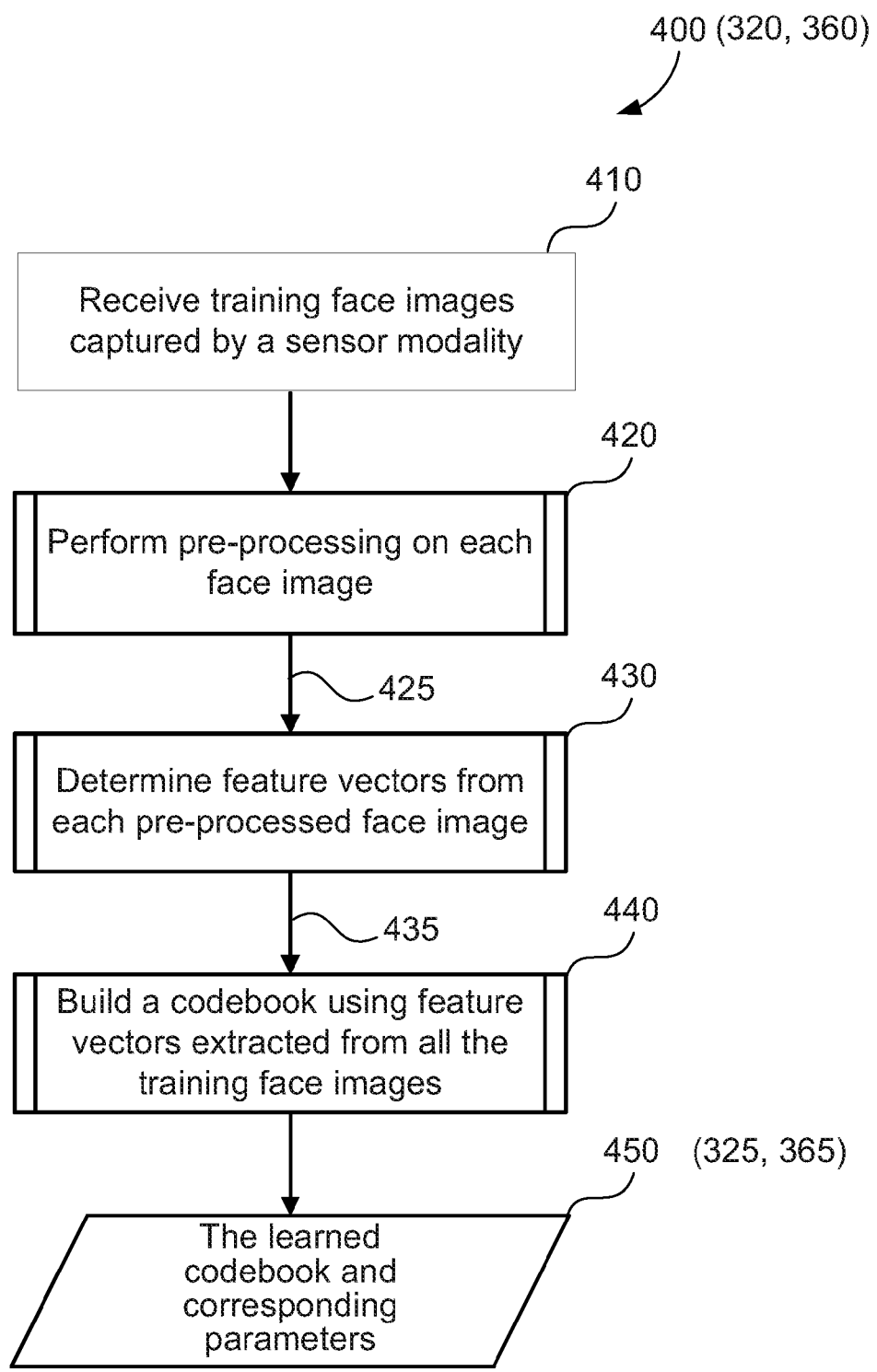
FIG. 4 is a schematic flow diagram showing a method of building a codebook for a single sensor modality, as executed in the method of FIG. 3.

FIG. 4 shows a schematic flow diagram illustrating a method 400 for building a codebook using training face images captured by a sensor modality, as executed at step 320 in FIG. 3A and at step 360 in FIG. 3B. The method 400 is typically implemented as one or more modules of the application 233 stored in the memory 209 and executed under control of the processor 205.

The method 400 begins at a step 410. in execution of step 410 training face images captured by a sensor modality are received. The training face images relate to the images received at step 310 of FIG. 3A or step 350 of FIG. 3B for example. The method 400 continues under execution of the processor 205 to a step 420 to generate a pre-processed image 425. At the step 420, each training face image is pre-processed. The method 400 continues to a step 430.

A set of feature vectors 435 is determined from each pre-processed face image 425 at execution of step 430. The method 400 continues to a step 440. A codebook is built using feature vectors determined from all the face images at step 440. The output of the method 400 is a learned codebook and corresponding parameters 450, corresponding to outputs 325 and 365, involved in the learning stage. The method 400 ends after execution of the step 440.

Figure 5:
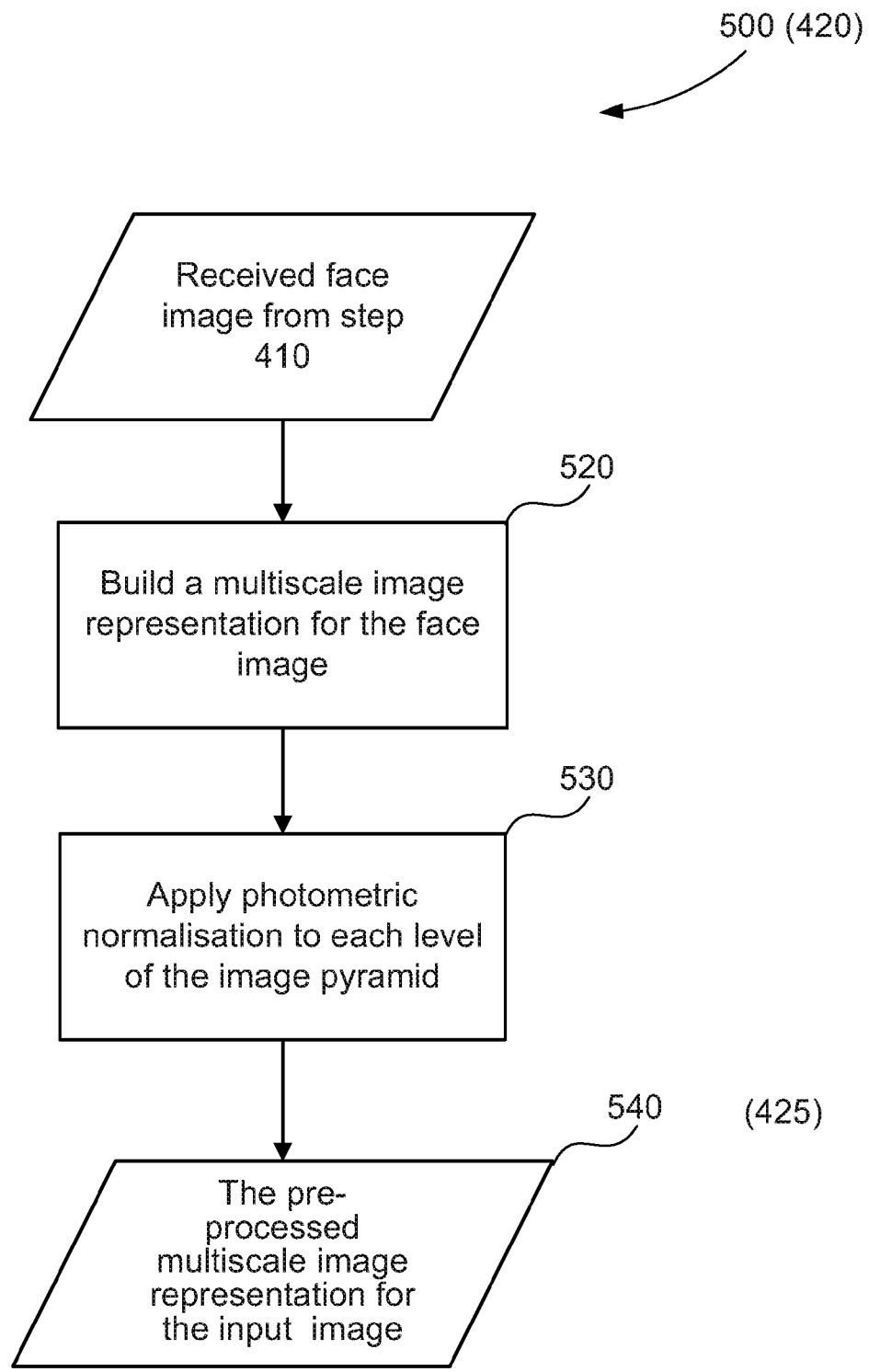
FIG. 5 is a schematic flow diagram showing a method of pre-processing an input face image, as executed in the method of FIG. 4.

FIG. 5 shows a schematic flow diagram illustrating a method 500 for pre-processing each training face image, as executed at step 420 in FIG. 4. The method 500 is typically implemented as one or more modules of the application 233 stored in the memory 209 and executed under control of the processor 205.

The method 500 begins at a step 520. In execution of step 520 a multiscale image representation is built for the input training face image received at the step 410. A number of image levels in a multiscale image representation is determined by the number of predefined scale factors in execution of step 520. The image at each level of the multiscale image representation is determined by resizing the input face image based on one of the predefined scale factors, e.g., 0.5.

The method 500 continues under execution of the processor 105 to a step 530. A photometric normalisation is applied to the image at each level of the multiscale image representation in execution of step 530. Photometric normalisation adjusts the local variations in a face image and enhances contrast of the face image. One method of photometric normalisation performs difference-of-Gaussians filtering on the face image that involves subtracting a blurred version of the face image by another less blurred version of the face image. The blurred versions of the face image are obtained by convolving the original face image with two Gaussian kernels having different standard deviations, e.g., 3.0 and 1.0. Histogram equalisation is then applied to the filtered image to enhance the contrast of the filtered image. The pixel intensity values in the histogram-equalised image are normalised to a predefined range, for example, [0,1] or [0, 255], using the linear normalisation method, for example. Other arrangements use methods of photometric normalisation including self-quotient image and truncating low frequency coefficients of a discrete cosine transform in the logarithmic domain. The output of the method 500 is a pre-processed multiscale image representation 540, corresponding to the output 425 of step 420 in FIG. 4.

Figure 6:
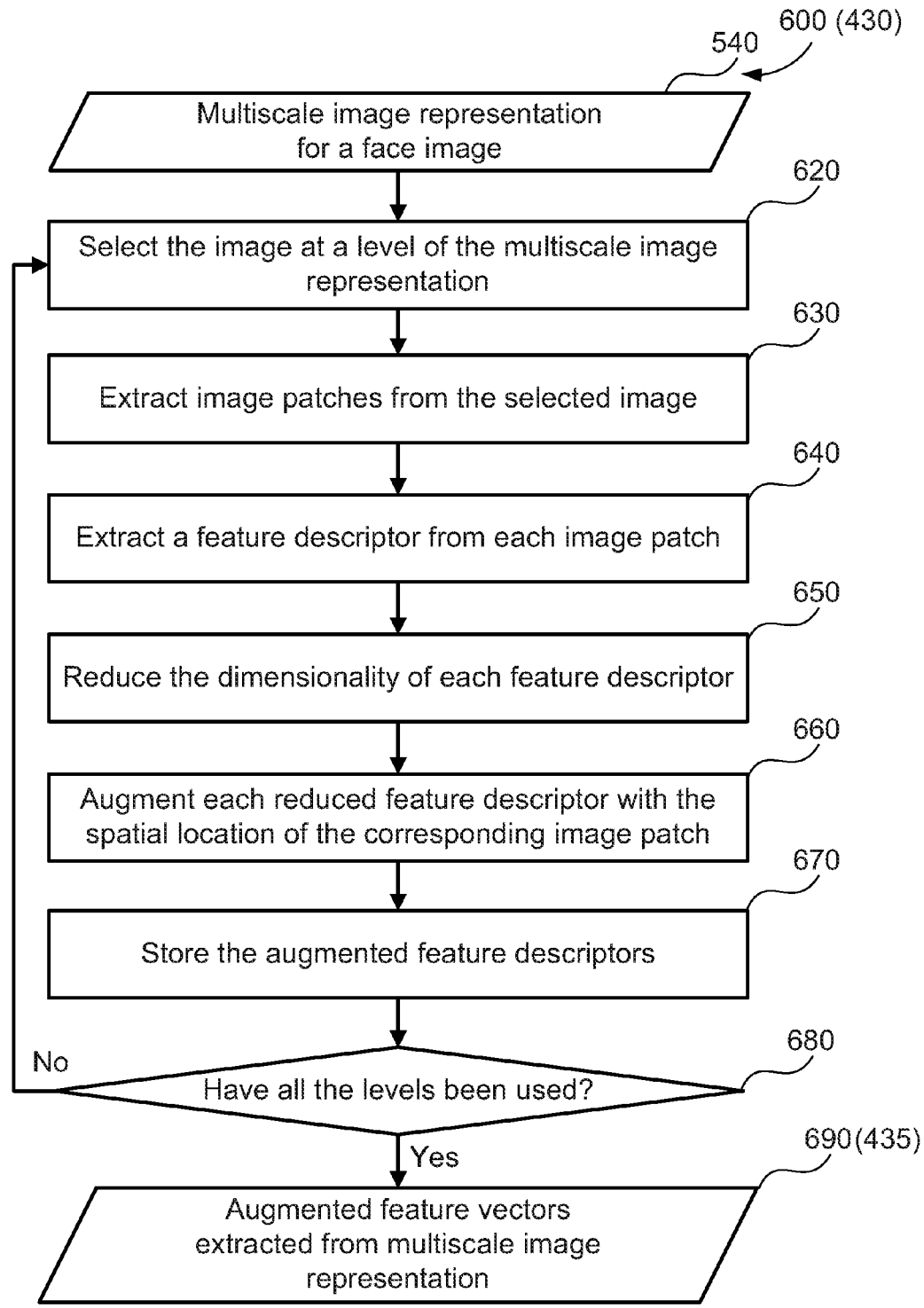
FIG. 6 is a schematic flow diagram showing a method of determining feature vectors from a pre-processed face image, as executed in the method of FIG. 4.

FIG. 6 shows a schematic flow diagram illustrating a method 600 of determining feature vectors from each pre-processed face image, as executed at step 430 in FIG. 4. The method 600 is typically implemented as one or more modules of the application 233 stored in the memory 209 and executed under control of the processor 205.

The method 600 begins at a step 620, where the multiscale image representation 540 for a face image is selected.

The method 600 progresses under execution of the processor 205 to a step 630. Local image patches are extracted from the selected image at execution of step 630. One method of image patch extraction applies dense sampling on a regular grid to the image. At each pixel location, the image region in a window, centred at the pixel location, is extracted. A predefined window size, e.g., 32×32, may be used. The window centred at the pixel location may have overlaps with windows centred at neighbouring pixel locations. The percentage of overlap, e.g., 50%, may be predefined. In other implementations, the method for image patch extraction uses an interest point detection method to detect interest points in the image. An example of interest point detection methods is Harris corner detection. The image region within a window centred at each interest point is then extracted.

After each image patch is extracted, the method 600 progresses under execution of the processor 205 to a step 640. A feature descriptor is extracted from the image patch at execution of step 640. A feature descriptor is a histogram of image gradient orientations that characterises the appearance and shape of an image patch. One example of a feature descriptor is a histogram of oriented gradients (HoG) descriptor. Another example of a feature descriptor is scale invariant feature transform (SIFT) descriptor. A feature descriptor is typically represented by a vector.

The method 600 continues under execution of the processor 205 to a step 650. Each feature vector is reduced to a predefined dimensionality, e.g., 64 or 32, at execution of step 650. The dimension reduction method used at the step 650 may be principal component analysis (PCA) or linear discriminant analysis (LDA).

The method 600 continues under execution of the processor 205 to a step 660. Each reduced feature vector is augmented with a spatial location of the corresponding image patch at execution of step 660. The spatial location of an image patch is in some implementations the x and y coordinates of the centre of a window where the image patch has been extracted. In other implementations, the spatial location of the image patch is the top left corner of the window where the image patch has been extracted. The spatial location of an image patch is normalised in some arrangements by the image size so that the values of x and y coordinates are between 0 and 1.

The method 600 continues under execution of the processor 205 to a step 670. All the augmented feature vectors are stored at execution of the step 670, for example in the memory 209.

The method 600 continues under execution of the processor 205 to a step 680. Step 680 is executed to check whether or not all the levels of multiscale image representation have been used. If there is a level that has never been used ("No" at step 680), the method 600 returns to select the image at that level at step 620. The method 600 continues and the image at the level is further processed from step 630 to step 680, as described above.

If all the levels of multiscale image representation have been used ("Yes" at step 680), the method 600 ends. The method 600 outputs augmented feature vectors 690, corresponding to the feature vectors 435, determined from the pre-processed multiscale image representation for a face image.

Figure 7:
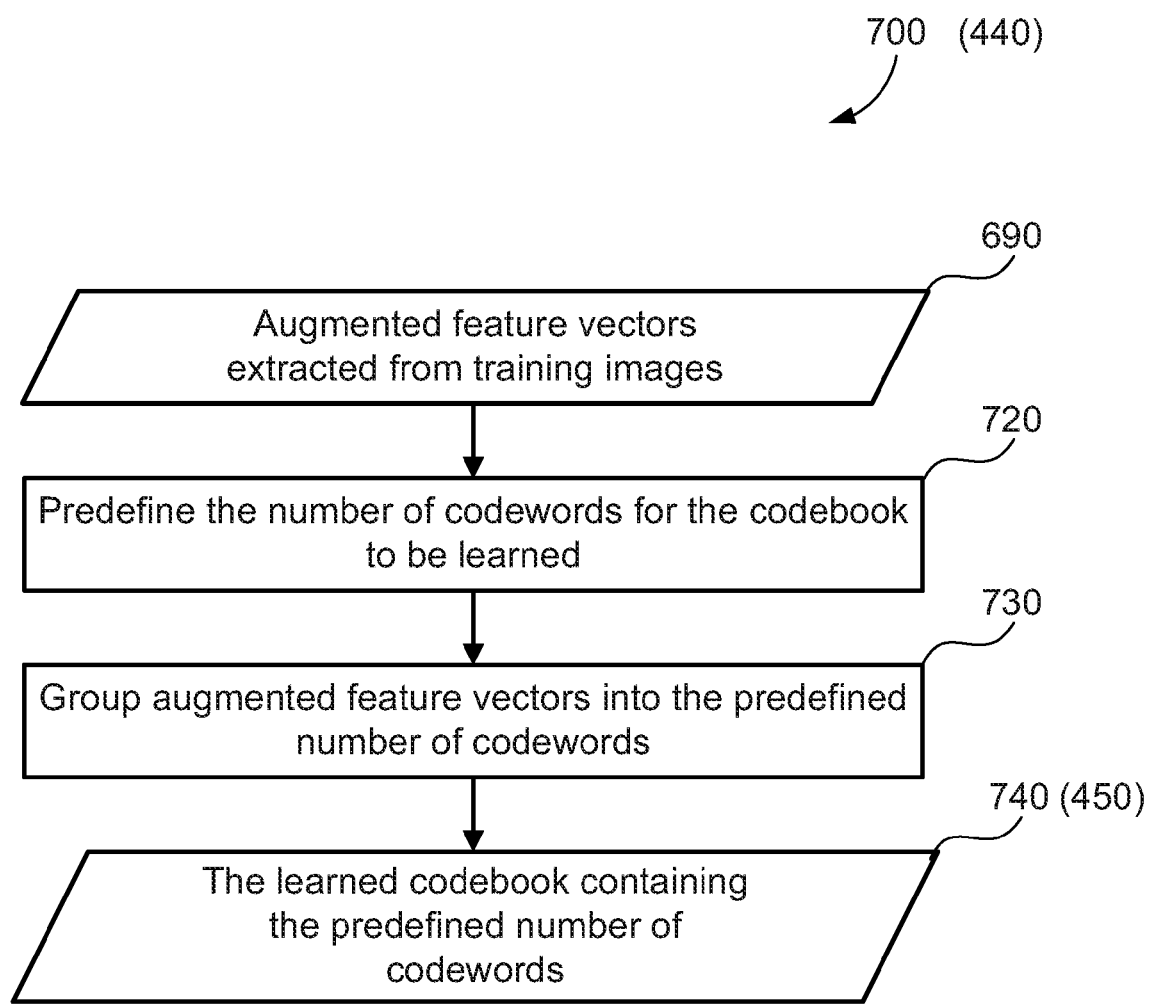
FIG. 7 is a schematic flow diagram showing a method of building a single codebook using feature vectors, as executed in the method of FIG. 4.

FIG. 7 shows a schematic flow diagram illustrating a method 700 of building a codebook using augmented feature vectors extracted from all the training face images, as executed at step 440 in FIG. 4. The method 700 is typically implemented as one or more modules of the application 233 stored in the memory 209 and executed under control of the processor 205.

A codebook is comprised of numerous codewords and each codeword is represented by one or more vectors. The number of codewords in the codebook built for a sensor modality, e.g., the codebook generated at step 320, may be different from the number of codewords in the codebook built for a different sensor modality, e.g., the codebook generated at step 360.

The method 700 begins at a step 720. Feature vectors are received and the number of codewords is defined for the codebook to be learned in execution of step 720. The feature vectors received are the feature vectors 690.

The method 700 continues under execution of the processor 205 to a step 730. The augmented feature vectors are grouped into the predefined number of codewords at step 730. Each codeword represents a subset of augmented feature vectors that have a similar feature distribution. Each codeword effectively represents a set of image patches having a similar appearance and shape. For example, a codeword may represent image patches extracted from an eye's regions within training face images.

The method for grouping feature vectors is to learn a Gaussian mixture model (GMM) to fit the probability distribution of augmented features. A Gaussian mixture model is a mixture of K multivariate Gaussian distributions expressed as Equation (1) below $$p(x|\theta) = \sum_{k=1}^{K} \alpha_k g(x|\mu_k, C_k) \quad (1)$$

where $g(x|\mu_k, C_k)$ represents the k-th multivariate Gaussian distribution with the mean $\mu_k$ and covariance matrix, $C_k$, x represents augmented features, $\alpha_k$ is the mixing factor or the weight for $g(x|\mu_k, C_k)$ and $\theta = \{\mu_k, C_k, \alpha_k, k=1, 2, \ldots, K\}$ denotes the parameters to be learned. The number of Gaussian distributions, K, is predefined at step 720 and is equivalent of the number of codewords. Each Gaussian distribution of the Gaussian mixture model is considered to be a codeword represented by the corresponding mean, $\mu_k$, and covariance matrix, $C_k$. A codebook is formed by all the Gaussian distributions of the Gaussian mixture model. Expectation Maximization (EM) algorithm is often used for learning a Gaussian mixture model or finding the mean and covariance matrix for each Gaussian distribution in order to fit the distribution of features. To reduce the number of parameters to learn, each Gaussian distribution of the Gaussian mixture model is limited to be a spherical Gaussian distribution, where the covariance matrix of the Gaussian mixture model is diagonal. That is, the covariance matrix for the k-th Gaussian distribution is $C_k = \sigma_k I$, where I represents an identity matrix and $\sigma_k$ represents the standard deviation. Therefore, each codeword is represented by the mean $\mu_k$, and standard deviation, $\sigma_k$, of a Gaussian distribution. As the Expectation Maximization algorithm is sensitive to the initial values of the parameters, a clustering method such as K-means may be used to pre-cluster feature vectors into numerous clusters and these clusters are subsequently used as the initial estimates of the parameters for the Expectation Maximization algorithm.

In other implementations, the method for grouping feature vectors is the K-means clustering that is able to group feature vectors into K clusters. Each cluster is represented by the mean, $\mu_k$, of all the feature vectors belonging to the cluster. The number of clusters, K, is predefined at step 720 and is equivalent of the number of codewords. Each cluster is considered to be a codeword represented by the corresponding mean $\mu_k$. A codebook is formed by all the clusters produced by the K-means clustering.

The output of the method 700 is a learned codebook 740 containing the predefined number of codewords.

Figure 8:
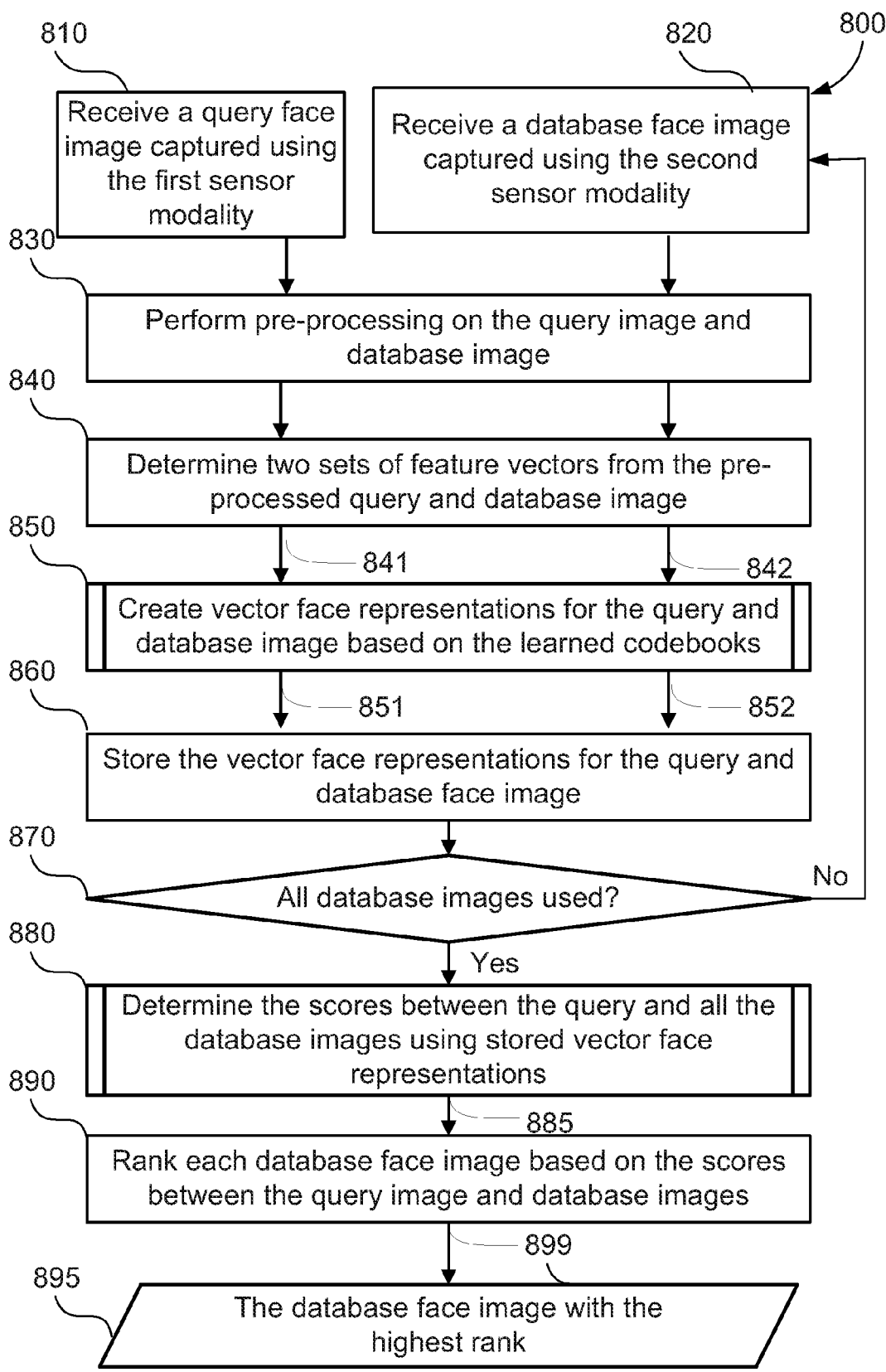
FIG. 8 is a schematic flow diagram showing a method of matching a query face image to a database face image.

FIG. 8 shows a schematic flow diagram illustrating a method 800 of matching a query face image captured by the first sensor modality to database face images captured by the second sensor modality. The method 800 is executed at the prediction stage. The method 800 is typically implemented as one or more modules of the application 233 stored in the memory 209 and executed under control of the processor 205.

The method 800 begins at a step 810. A query image is received in execution of the step 810. The method 800 also includes a step 820 which can be executed in parallel to, or before or after step 810. A database image is received in execution of the step 820. The query image in the example of FIG. 8 is received from the sensor array 215 of the camera module 201. The database image in the example of FIG. 8 is received from a database of images stored on the computer system 150. The query image is captured using the first sensor modality, and the database image captured using the second sensor modality. The query image and the database images are face images.

The method 800 progresses under execution of the processor 205 to a step 830. The pre-processing method 500 described in relation to FIG. 5 is performed on each of the query image and the database image at step 830.

The method 800 progresses under execution of the processor 205 to a step 840. Two sets of feature vectors are determined at execution of step 840 by using the method 600 described in relation to FIG. 6. The step 840 effectively operates to extract patch-based features from each of the query face image and the database image. One set of feature vectors is determined from the pre-processed query face image while the other set of feature vectors is determined from the pre-processed database face image. Execution of the step 840 generates a set of feature vectors 841 relating to the query image and a set of feature vectors 842 relating to the database image.

The method 800 progresses to a step 850. Vector face representations for each of the query face image and database face image are created based on the corresponding learned codebooks built at steps 320 (FIG. 3A) and 360 (FIG. 3B) at the step 850. Execution of the step 850 generates vector representation 851 for the query image and vector representation 852 for the database image using one or more of the learned codebooks. The step 850 effectively operates to determine vector distance distributions based one or more of the codebooks for each of the query image and the database image. The method 800 progresses to a step 860. The vector face representations 851 and 852 are stored at step 860, for example in the memory 209.

The method 800 progresses to a check step 870. Step 870 executes to check whether or not all the images of the database have been received. If all the database images have not been received ("No" at step 870), the method 800 progresses to receive a new database image at step 820 and to progress from step 830 to step 870, as described above. If all the database images have been received ("Yes" at step 870), the method 800 continues to a step 880. Scores between the query image and all received database images are determined at step 880 using the stored vector face representations of step 860. Each determined score measures the similarity or distance between the query image and a database image, for matching the query image and the database image. Execution of the step 880 generates scores 885.

Vector representations for database images and the query image are generated based on the learned codebooks. The vector representations are used to determine the score or distance between a database image and the query image. The query image and the database image may be matched although the facial features in each may not be aligned.

The method 800 continues under execution of the processor 205 to a ranking step 890. The database images are ranked based on a comparison of the corresponding score of each database to the query face image at execution of step 890. The database image with the highest score is ranked highest, for example. The output of the execution step 890 is a database 899 of face images arranged in a determined ranking order. For example, if a distance is used as a score function, the database face images are arranged in an ascending order by sorting the distances. The database image with the smallest distance is ranked highest and considered as the closest match to the query face image. The steps 880 and 890 effectively operate to match the query image to the database image using the determined scores.

There are three alternate methods 900, 901, and 902 which may be used for creating vector face representation for a face image based on one or two learned codebooks, as executed at step 850 in FIG. 8. The methods 900, 901 and 902 are described hereafter in relation to FIGS. 9A, 9B and 9C. Each of the methods 900, 901 and 902 is typically implemented as one or more modules of the application 233 stored in the memory 209 and executed under control of the processor 205.

Regardless of which of the methods 900, 901 and 902 is implemented at step 850, the implemented method is executed for each of the query image and the database image. The query image and the database image are each referred to as a "face image" in relation to FIGS. 9-11.

Figure 9A:
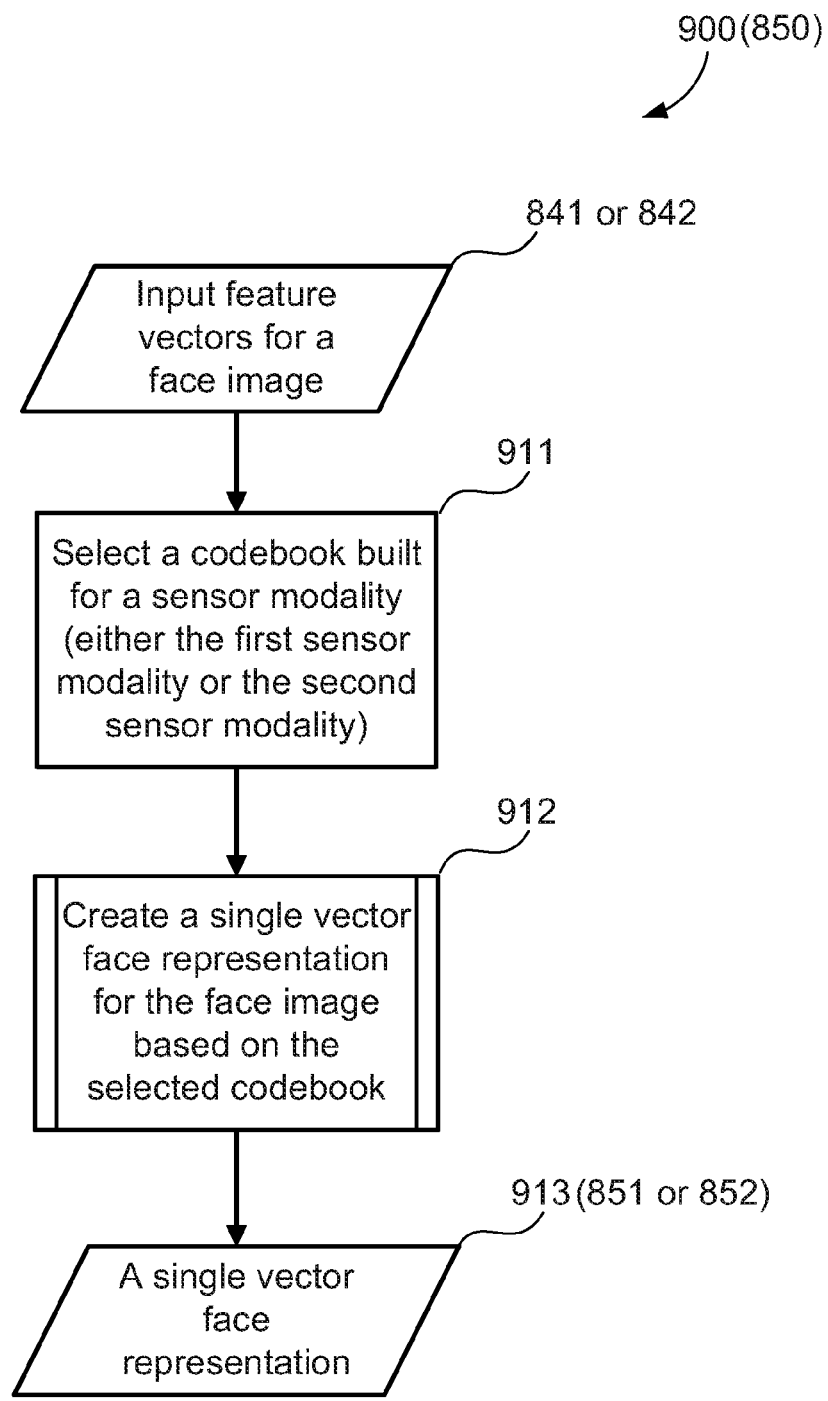

FIG. 9A shows a schematic flow diagram illustrating the method 900 for creating a single vector face representation for a face image using the augmented feature vectors determined from the face image. The vector creation method 900 begins at a step 911. In execution of the step 911 feature vectors 841 or 842 determined from a face image (at step 840 of FIG. 8) are received and a codebook is selected. The selected codebook may be the codebook built for the first sensor modality (as per step 320 of FIG. 3A) or the codebook built for the second modality (as per step 360 of FIG. 3B). The method 900 continues under execution of the processor 205 to a step 912. A single vector face representation for the face image is created at step 912 based on the selected codebook using all the feature vectors determined from the face image. The output of the method 900 is a single vector face representation 913 for the face image, corresponding to the representation 851 or 852.

FIG. 9B shows a schematic flow diagram illustrating the method 901 for creating a single vector face representation for a face image using all the augmented feature vectors determined from the face image. The vector creation method 901 begins at a step 941. In execution of the step 941, feature vectors 841 or 842 determined from a face image (from step 840 of FIG. 8) are received and a new codebook is formed by merging the codebook built or learned for the first sensor modality (320 of FIG. 3A) with the codebook built or learned for the second modality (360 of FIG. 3B). The new codebook contains all the codewords from both of the codebooks. The method 901 continues to a step 942. A single vector face representation for the face image is created at execution of step 942 based on the new codebook using all the feature vectors determined from the face image. The output of the method 901 is a single vector face representation for the face image, corresponding to the representation 851 or 852.

Figure 9C:
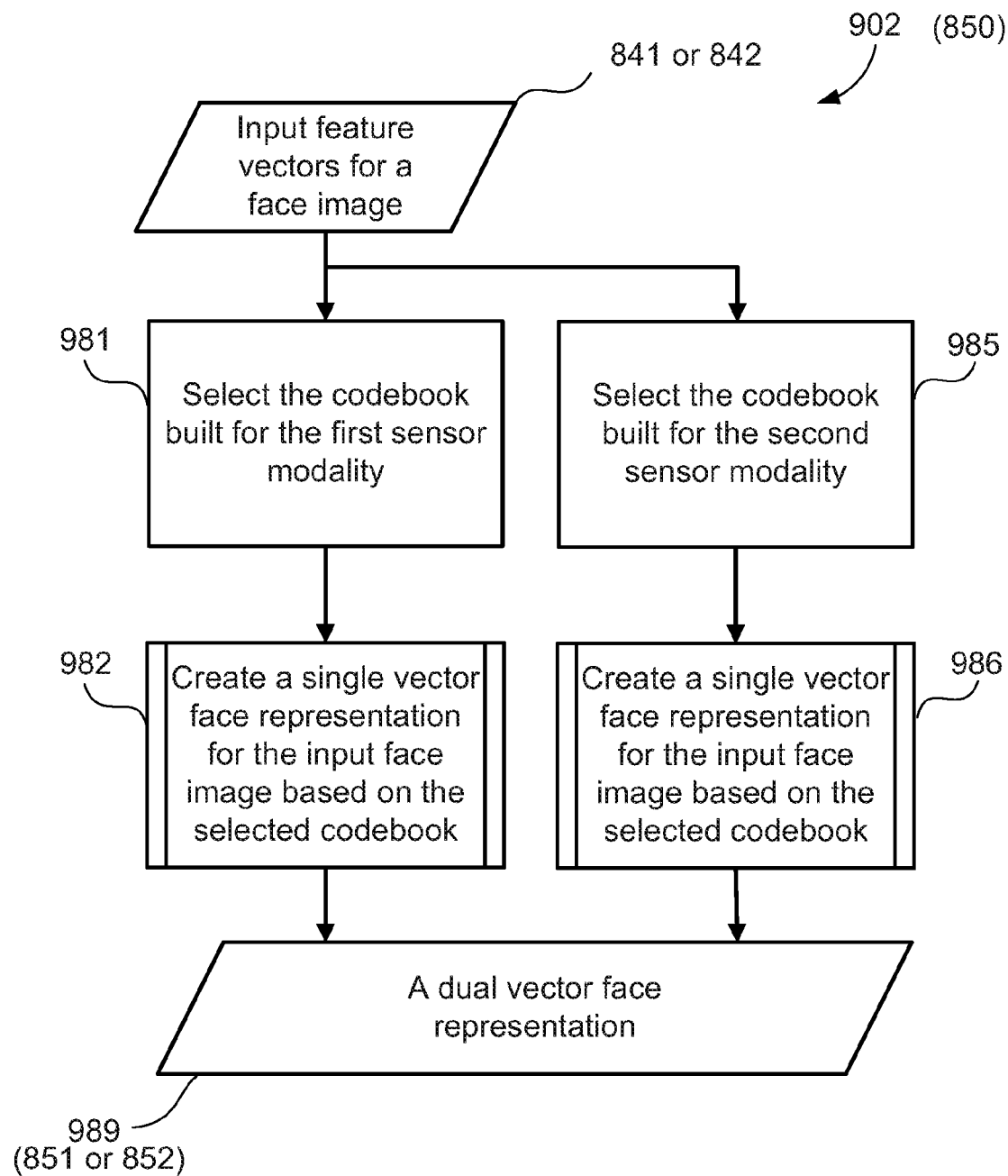

FIG. 9C shows a schematic flow diagram illustrating the method 902 for creating a dual vector face representation for a face image using all the augmented feature vectors determined from the face image. The vector creation method 902 begins at a step 981. In execution of the step 981, feature vectors determined from a face image (from step 840 of FIG. 8) are received and the codebook built for the first sensor modality (step 320 of FIG. 3A) is selected. The method 902 continues from step 981 to a step 982. A single vector face representation for the face image is created at execution of step 982 based on the selected codebook for the first sensor modality using all the feature vectors determined from the face image.

The method 800 also executes a step 985. In some arrangements, the step 985 is executed in parallel with the step 981, as shown in FIG. 9C. In other arrangements, the step 985 is executed before or after the step 981. To create the other single vector face representation, the codebook built for the second sensor modality (step 360 of FIG. 3B) is selected at execution of the step 985. The method 902 continues from step 985 to a step 986. A single vector face representation for the face image is created at execution of the step 986 based on the selected codebook for the second sensor modality using all the feature vectors determined from the face image. The output of the method 902 is a dual vector face representation for the face image 989. The dual vector representation comprises the vector created based on the codebook built for the first sensor modality at the step 982 and the vector created based on the codebook built for the second sensor modality at the step 986. The dual vector representation 989 corresponds to the representation 851 or 852.

Figure 10:
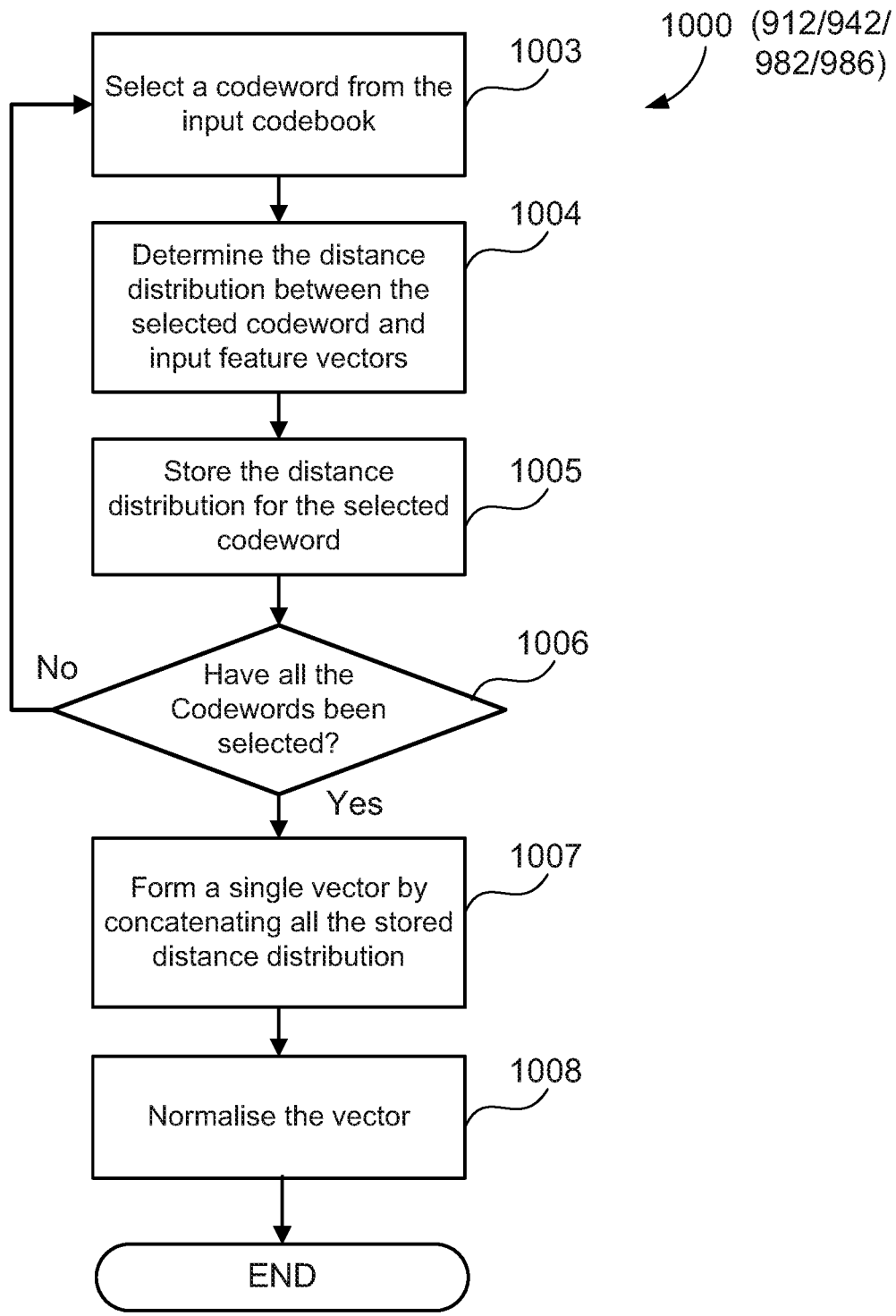
FIG. 10 is a schematic diagram showing a method of creating a single vector face representation for a face image based on a learned codebook, as executed in each method of FIG. 9A, FIG. 9B, and FIG. 9C.

FIG. 10 shows a schematic flow diagram illustrating a method 1000 of creating a vector face representation for a face image based on a selected codebook, as executed at step 912 in FIG. 9A, step 942 in FIG. 9B, and steps 982 and 986 in FIG. 9C. The method 1000 is typically implemented as one or more modules of the application 233 stored in the memory 209 and executed under control of the processor 205.

The method 1000 begins at a step 1003. In execution of the step 1003, a selected codebook is received and a codeword of the codebook is selected (for example the codebook created at step 911 in FIG. 9A).

The method 1000 continues under execution of the processor 205 to a step 1004. The distance distribution between the selected codeword and each of the received feature vectors is determined at execution of step 1004. If the codebook is learned using a Gaussian mixture model, a codeword is represented by the mean, $\mu_k$, and standard deviation, $\sigma_k$, of a Gaussian distribution associated with the Gaussian mixture model. The distance distribution includes the averaged first-order and averaged second-order distances. The averaged first-order distance vector, $u_k$, and the averaged second-order distance vector, $v_k$, based on the k-th codeword of the codebook are determined using Equation (2) and Equation (3) below:

$$u_k = \frac{1}{N\sqrt{\alpha_k}} \sum_{i=1}^{N} q_{ik} \frac{x_i - \mu_k}{\sigma_k} \quad (2)$$

$$v_k = \frac{1}{N\sqrt{2\alpha_k}} \sum_{i=1}^{N} q_{ik} \left[ \left( \frac{x_i - \mu_k}{\sigma_k} \right)^2 - 1 \right] \quad (3)$$

where $x_i$ represents a feature vector, N is the total number of feature vectors, $\alpha_k$ is the mixing coefficient for the k-th Gaussian distribution of the Gaussian mixture model, and $q_{ik}$ is the posterior probability of a feature vector $x_i$ belonging to the k-th Gaussian distribution of the Gaussian mixture model. The posterior probability $q_{ik}$ is written as Equation (4):

$$q_{ik} = \frac{\exp\left[-\frac{1}{2}(x_i - \mu_k)^T C_k^{-1}(x_i - \mu_k)\right]}{\sum_{k=1}^{K} \exp\left[-\frac{1}{2}(x_i - \mu_k)^T C_k^{-1}(x_i - \mu_k)\right]} \quad (4)$$

If the codebook is learned using K-mean clustering, a codeword is only represented by the mean $\mu_k$, of a cluster. The distance distribution includes the averaged first-order distances. The averaged first-order distance vector, $u_k$, based on the k-th codeword of the codebook is determined from Equation (5) below:

$$u_k = \frac{1}{N}\sum_{i=1}^{N} x_i - \mu_k \quad (5)$$

The method 1000 continues from step 1004 to a step 1005. The distance distribution computed based on the selected codeword is stored at execution of step 1005, for example in the memory 209.

The method 1000 continues from step 1005 to a check step 1006. Step 1006 executes to check whether or not all the codewords of the codebook have been selected. If execution of step 1006 determines that there is a codeword that has not been selected ("No" at step 1006), the method 1000 returns to step 1003. The codeword is selected at step 1003, the distance distribution based on the selected codeword determined at step 1004 and stored at step 1005, as described above. If all the codewords of the codebook are determined to have been selected, ("Yes" at the step 1006), the method 1000 continues to a step 1007. A single vector is formed in execution of step 1007. The single vector is formed by concatenating all the stored distance distributions. If the codebook is learned using a Gaussian mixture model, the single vector z is formed as $z=[u_1, v_1, u_2, v_2, \ldots, u_K, v_K]$, where K is the total number of codewords of the codebook, $u_k$ and $v_k$ represent the averaged first-order and averaged second-order distance vector computed based on the k-th codeword, respectively. If the codebook is learned using K-means clustering, the single vector z is formed as $z=[u_1, u_2, \ldots, u_K]$.

The method 1000 continues from the step 1007 to the step 1008. The formed single vector is normalised in execution of step 1008. The formed single vector may be normalised by different normalisation strategies. The arrangements described normalise the whole vector by the 2-norm of the vector. Another implementation normalises each distance vector, e.g. $u_k$, by the 2-norm of the distance vector. The output of the method 1000 is a single vector face representation 1009 for the face image created based on the input codebook.

Returning to FIG. 8, in order to rank each database face image at step 890, the scores between the vector face representation of the query face image and the vector face representations of all the database face images need to be determined. The score calculation for single vector face representations and dual vector face representations are different.

Figure 11A:
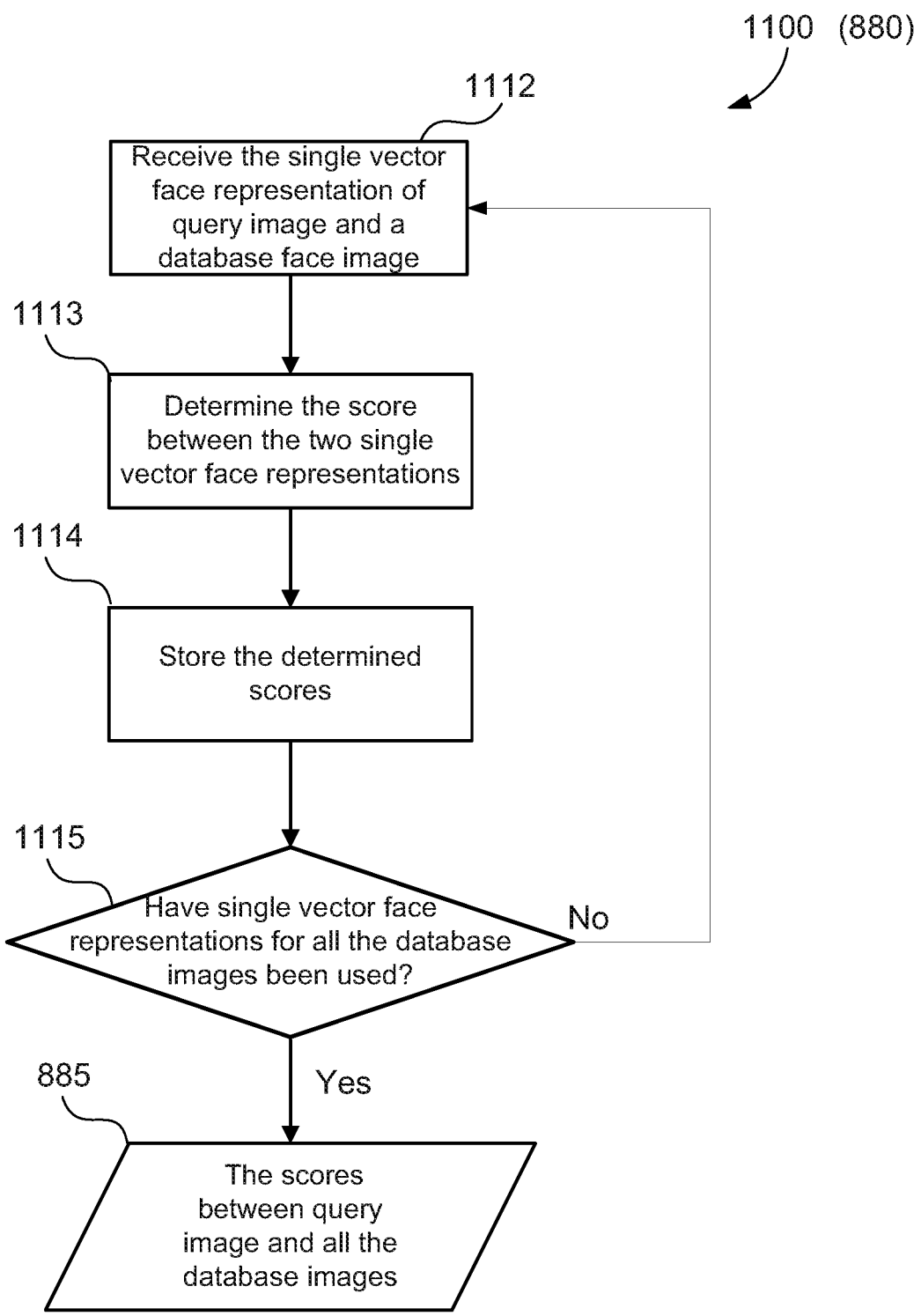
FIG. 11A and FIG. 11B are schematic diagrams showing the methods of determining a distance between a query image and database images based on vector face representations, as executed in the method of FIG. 8.

FIG. 11A shows a schematic flow diagram illustrating a method 1100 for determining the scores between the query face image and the database face images when represented by single vector face representations, as executed at step 880 in FIG. 8. The method 1100 is typically implemented as one or more modules of the application 233 stored in the memory 209 and executed under control of the processor 205.

The method 1100 begins at a step 1112. The single face representation of a database face image is received at execution of step 1112, corresponding to the representation 851 or 852. The method 1100 continues to a step 1113. The score between the received single vector face representation of the database face image and the single vector face representations of the query face image is determined in execution of the step 1113. The score determined at step 1113 relates to a distance between the single vector representation of the database face image and the single vector face representations of the query face image, determined using a score function. The selection of a score function for use in execution of step 1113 is significant in relation to performance of face verification by the system 200. In the example of FIG. 11A, the score function is a cosine distance function. In another implementation, the score function is a dot product function. The score function in other implementations is learned from a set of training samples by using a metric learning method. Each training sample contains a pair of single vector face representations and a classification label. One of the single vector face representations is created from a face image captured using the first sensor modality. The other single vector face representation is created from a face image captured using the second sensor modality. The classification label is typically defined to be similar or dissimilar to indicate whether or not single vector face representations are created from the same person's face images.

One example of metric learning methods relates to learning a low rank Mahalanobis distance metric such that the distance between single vector face representations is smaller if the classification label of the training sample is similar while the distance between single vector face representations is larger if the classification label of the training sample is dissimilar. Another example of a metric learning method is kernel canonical correlation analysis that learns two projections from training samples with the classification labels to be similar. The two projections are learned to maximise the correlation between single vector face representations from the first sensor modality and single vector face representations from the second sensor modality in a feature space. One projection projects single vector face representations from the first sensor modality into the feature space while the other projection is learned to project single vector face representations from the second sensor modality into the feature space. Another example of a metric learning method is kernel manifold alignment that learns projections from training samples with the classification labels to be similar. The projections are learned to project single vector face representations from the first sensor modality and the second sensor modality into a new space such that the distances between projected single vector face representations are minimised and the underlying structures of single vector face representations from the first sensor modality and the second sensor modality are aligned. The method 1100 continues to a step 1114. The determined score is stored at step 1114, for example in the memory 209.

The method 1100 continues under execution to the processor 205 to a check step 1115. Step 1115 executes to check whether or not single vector face representations of all the database images have been used. If the step 1115 determines that there is a single vector face representation of a database image that has never been used ("No" at step 1115), the method 1100 returns to step 1112. The single vector face representation that has not been used is received at execution of step 1112 and the method 1100 continues from step 1113 to step 1115 as described above. If step 1115 executes to determine that single vector face representations of all the database images have been used, the method 1100 ends. Upon the method 1100 ending, the determined scores between the query face image and the database face images are outputted to ranking step 890 in FIG. 8. The determined score relate to the scores 885 of FIG. 8.

Figure 11B:
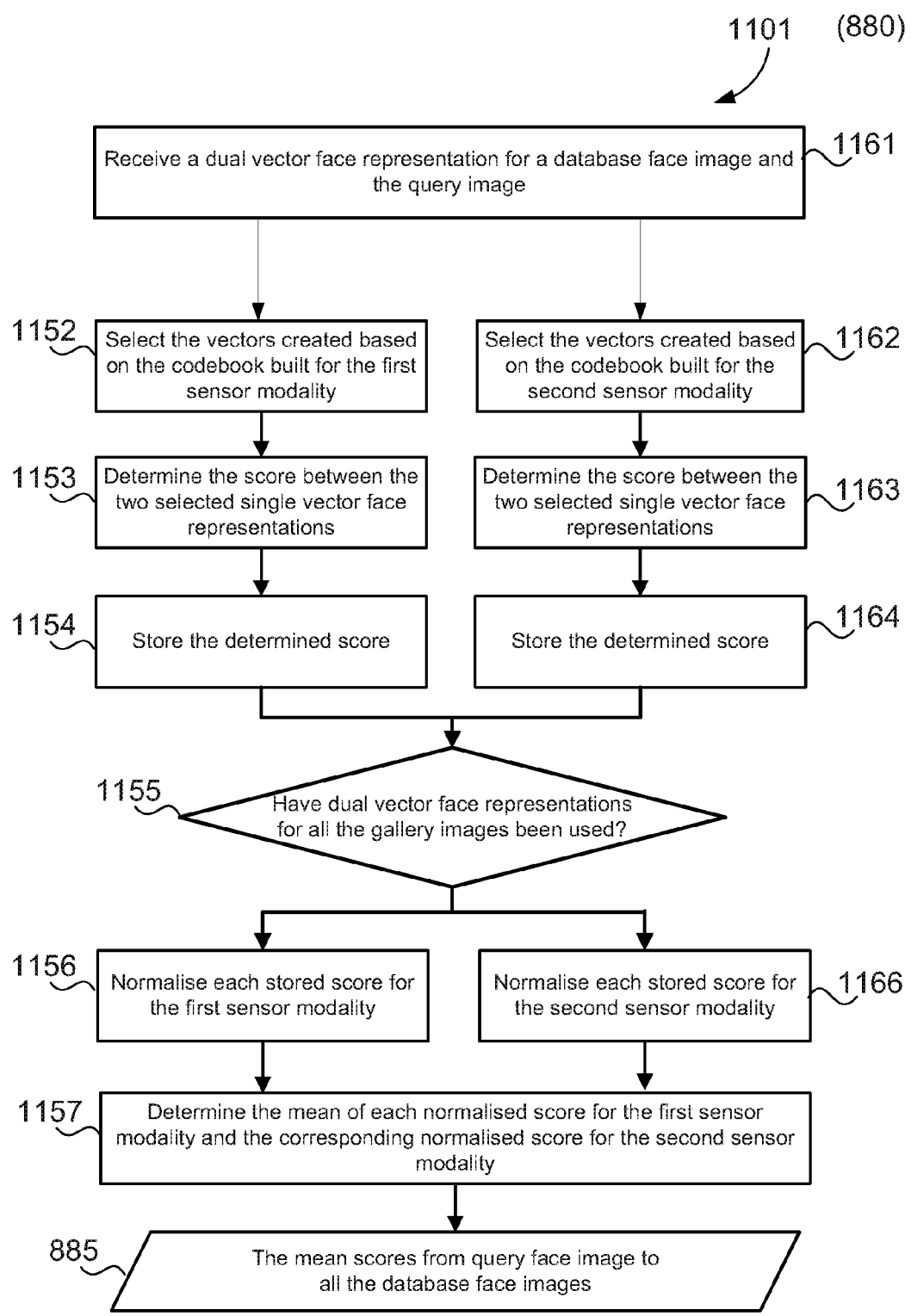

FIG. 11B shows a schematic flow diagram illustrating a method 1101 of determining the scores between the query face image and all the database face images when represented by dual vector face representations, as executed at step 880 in FIG. 8. The method 1100 is typically implemented as one or more modules of the application 233 stored in the memory 209 and executed under control of the processor 205.

The method 1101 begins at a step 1161. In execution the step 1161, the dual face representations of the database face image and the query image are received, corresponding to the representations 851 and 852. Each dual vector face representation contains two single vector face representations, as created by the method 902. The first vector is created based on the codebook built for the first sensor modality, and the second vector is created based on the codebook built for the second sensor modality. In the arrangements described, the dual vector face representations for query and database face image are referred to as Q=[$q_1$, $q_2$] and G=[$g_1$, $g_2$], respectively.

The method 1101 continues to a step 1152. The vectors, $q_1$ and $g_1$, in Q and G created based on the codebook built for the first sensor modality are selected at execution of the step 1152. The method 1101 continues to a step 1153. The score $d_1(q_1, g_1)$ between $q_1$ and $g_1$ is determined at execution of step 1153. The step 1153 determines the score $d_1(q_1, g_1)$ in the same manner as described in relation to step 1113 in FIG. 11A.

The method 1101 continues under execution of the processor 205 to a step 1154. The score determined at step 1153 is stored in execution of step 1154.

The method 1101 continues under execution of the processor 205 to a check step 1155. The step 1155 executes to check whether or not dual vector face representations for all the database images have been used. If there is a dual vector face representation of a database image that has not been used ("No" at step 1155), the method 1101 returns to step 1161. A dual vector face representation that has not yet been used is received at the step 1161 and the method 1101 further executes to continue from step 1152 to step 1155, as described above. If dual vector face representations of all the database images have been used, ("Yes" at step 1155), the method 1101 continues under execution of the processor 205 to a step 1156. Each stored score is normalised at execution of step 1156 using a min-max normalisation method. If there are N dual vector face representations for N database face images, the normalised score $\bar{d}_1(n)$, between query face image and the n-th database face image is determined according to Equation (6)

$$\bar{d}_1(n) = \frac{d_1(q_1, g_1(n)) - \max_n d_1(q_1, g_1(n))}{\max_n d_1(q_1, g_1(n)) - \min_n d_1(q_1, g_1(n))} \quad (6)$$

where $d_1(q_1, g_1(n))$ represents the score between $q_1$ of the dual vector representation for the query face image and $g_1(n)$ of the dual vector representation for the n-th database face image, $\max_n d_1(q_1, g_1(n))$ represents the maximum score of the computed scores for the first sensor modality, and $\min_n d_1(q_1, g_1(n))$ represents the minimum score of the computed scores for the first sensor modality.

In order to determine the scores for the second sensor modality, the method 1101 includes a step 1162. The vectors, $q_2$ and $g_2$, in Q and G created based on the codebook built for the second sensor modality are selected at execution of step 1162. The method 1101 continues from step 1162 to a step 1163. The score $d_1(q_2, g_2)$ between $q_2$ and $g_2$ is determined at execution of step 1163, in a similar manner to step 1153. The method 1101 continues from step 1163 to a step 1164. The score determined in execution of step 1163 is stored at step 1164, for example in the memory 209.

The steps 1162 to 1164 are implemented in parallel to the steps 1152 to 1154 in the example of FIG. 11B. In other implementations, the steps 162 to 1164 may be executed before, after or interleaved between the steps 1152 to 1154.

The step 1155 checks whether or not dual vector face representations for all the database images have been used, as described above. If there is a dual vector face representation of a database image that has not been used, a further dual vector face representation is received at step 1161 and further processed from step 1162 to step 1155 as described above. If dual vector face representations of all the database images have been used, the method 1101 includes a step 1166 relating to the second sensor modality. In the example of FIG. 11B, step 1166 is executed in parallel with the step 1156. In other implementations, the step 1166 may be implemented before or after the step 1156. Each stored score relating to the second sensor modality is normalised at step 1166 using the min-max normalisation method, being the same normalisation method performed at step 1156. The normalised score between the query face image and each database face image, e.g., the n-th database face image, $\bar{d}_2(n)$, is determined for the second sensor modality.

Once two sets of normalised scores between the query face image and all the database face images, $\{\bar{d}_1(n), n=1, 2, \ldots, N\}$ and $\{\bar{d}_2(n), n=1, 2, \ldots, N\}$, are obtained, the method 1101 continues under execution of the processor 205 to a step 1157. A mean score between the query face image and each database face image is determined at step 1157. The mean score relates to the score 885 of FIG. 8. The mean score between query face image and the n-th database face image is determined using Equation (7) below:

$$d(n) = \tfrac{1}{2}(\bar{d}_1(n) + \bar{d}_2(n)) \quad (7)$$

The method 1101 ends upon determining the mean scores, $\{d(n), n=1, 2, \ldots, N\}$, between query face image and all the database face images. The determined mean scores outputted from the method 1101 for use at the ranking step 890 in FIG. 8.

The list of ranked scores determined at execution of the step 890 is used to determine whether a match has been made between the query image and one of the database images.

The arrangements described are applicable to the computer and data processing industries and particularly for the image processing and image matching and security industries.

As described above, the alternate methods relate to methods that enable the face of a target to be matched across different sensor modalities despite variations in viewpoint or pose. The alternate methods described build codebooks using training images based upon both the first and second sensor modalities. By learning a model that is able to represent face image patches having a similar appearance in a sensor modality, a face representation can be created for cross-modality face verification. Using the distributions of differences between patch-level features extracted from a face image and models learned from different sensor modalities for creating a face representation makes cross-modality face verification implementable even if the query and database images of the face are not aligned.

Vector representations for the database images and the query image are generated using the learned codebooks. According to the arrangements described, the query image and the database image may be matched although the facial features in each may not be aligned.

The arrangements described provide methods by which face images captured by cameras such as surveillance cameras can be matched. The arrangements described are particularly useful in the security industry. For example, an incident may have occurred in the vicinity of the scene 110 of FIG. 1B(1) shortly after time of capture of an image of the scene 110. Persons in the area of the incident near that time may be of interest to security forces. If the face of the query image 199 of FIG. 1B(2) is found to match the face of the database image 191 of FIG. 1B(1), security forces may require details regarding the match.

The camera module 201 is in some arrangements configured to transmit information relating to the score matching the query image and database image via the network 220, for example to a computer system such as the system 150 operated by security providers. Information related to the score can include any of the score determined at step 800, the ranking of the score determined at step 890. Information related to the score transmitted via the network can include the query image and the database image, and parameters of the images such as time and location of capture of the images in some implementations.

The foregoing describes only some embodiments of the present invention, and modifications and/or changes can be made thereto without departing from the scope and spirit of the invention, the embodiments being illustrative and not restrictive.

The invention claimed is:

1. A method for an electronic device, the method comprising:
   extracting features from each of a query image acquired in a first modality and a database image acquired in a second modality, wherein the first modality is different from the second modality, the query image is a face image and the database image is a face image having a head pose that is different from a head pose of the query image, and the query image and the database image are not aligned when the features are extracted;
   determining, based on a codebook for the first modality, a vector distance distribution for the query image represented by the extracted features and a vector distance distribution for the database image represented by the extracted features;
   generating a set of distances between the vector distance distribution determined for the query image and the vector distance distribution determined for the database image;
   determining a score for matching the query image and the database image based on the determined set of distances; and
   transmitting information related to the determined score to a server to cause the server to match the query image to the database image using the transmitted information and to display matched images to a user of the server.

2. The method according to claim 1, further comprising creating the codebook from a learned codebook for the first modality and a learned codebook for the second modality.

3. The method according to claim 1, further comprising building the codebook for the first modality using a range of training images.

4. The method according to claim 1,
   wherein the first modality relates to one of the following: image capture using a visible light sensor, an infrared sensor, and a sensor for a time-of-flight camera, and
   wherein the second modality relates to one of the following: image capture using a visible light sensor, an infrared sensor, and a sensor for a time-of-flight camera.

5. The method according to claim 1, wherein determining the vector distance distribution includes determining a vector representation for the features of the query image and determining a vector representation for the features of the database image.

6. The method according to claim 1, wherein determining the vector distance distribution for the query image includes determining distance between a vector representation of the features of the query image and each codeword of the codebook.

7. The method according to claim 1, wherein determining the vector distance distribution for the database image includes determining distance between a vector representation of the features of the database image and each codeword of the codebook.

8. The method according to claim 1, wherein the set of distances is determined using a function learned using a set of training images.

9. The method according to claim 1, further comprising ranking the score of the query image and the database image in comparison with a score of the query image and another database image to match the query image.

10. The method according to claim 1, further comprising matching the query image and the database image based on the determined score.

11. The method according to claim 1, wherein the vector distance distributions include first vector distance distributions, and the set of distances includes a first set of distances, the method further comprising:
    selecting a second codebook associated with the second modality;
    determining a second vector distance distribution based on a codebook for the second modality for each of the query image and the database image;
    determining a second set of distances between the determined second vector distance distribution for the query image and the determined second vector distance distribution for the database image; and
    determining the score based on the first set of distances and the second set of distances.

12. The method according to claim 1, wherein the query image is a face image captured at a first time instant and the database image is a face image captured at a second time instant that is different from the first time instant, the method further comprising matching the database face image to the query face image based on the determined score.

13. The method according to claim 12,
    wherein the first modality relates to one of: image capture using a visible light sensor, an infrared sensor, and a sensor for a time-of-flight camera, wherein the second modality relates to one of: image capture using a visible light sensor, an infrared sensor, and a sensor for a time-of-flight camera, wherein the image capture related to the first modality is different from the image capture related to the second modality, and wherein matching the database face image to a query face image includes using other than a facial landmark or a face alignment.

14. The method according to claim 1, wherein a first camera associated with the first modality has a field of view and a second camera associated with the second modality has a field of view that does not overlap with the field of view of the first camera.

15. The method according to claim 14,
wherein a viewpoint of the query image is different to a viewpoint the database image, or
wherein a pose in the query image is different to a pose in the database image.

16. A method for an electronic device, the method comprising:
extracting features from each of a query image acquired in a first modality and a database image acquired in a second modality, wherein the first modality is different from the second modality, the query image is a face image and the database image is a face image having a head pose that is different from a head pose of the query image, and the query image and the database image are not aligned when the features are extracted;
determining a first vector distance distribution based on a codebook for the first modality and a second vector distance distribution based on a codebook for the second modality, wherein the first and second vector distance distributions is for each of the query image and the database image represented by the features respectively;
determining a first set of distances between the determined first vector distance distributions for the query image and the database image;
determining a second set of distances between the determined second vector distance distributions for the query image and the database image;
determining a score based on the first set of distances and the second set of distances;
matching the query image to the database image using the determined score; and
causing a user interface to display matched images to a user.

17. The method according to claim 16, wherein determining the score includes normalizing the first set of distances and the second set of distances.

18. The method according to claim 16, wherein determining the score includes determining a mean of the first set of distances and the second set of distances.

19. A camera comprising:
a sensor configured to capture a query image using a first modality;
a processor; and
a memory, the memory having instructions thereon executable by the processor to perform operations including:
extracting features from each of the query image acquired in a first modality and a database image acquired in a second modality, wherein the first modality is different from the second modality, the query image is a face image and the database image is a face image having a head pose that is different from a head pose of the query image, and the query image and the database image are not aligned when the features are extracted,
determining, based on a codebook for the first modality, a vector distance distribution for the query image represented by the extracted features and a vector distance distribution for the database image represented by the extracted features,
generating a set of distances between the vector distance distribution determined for the query image and the vector distance distribution determined for the database image,
determining a score for matching the query image and the database image based on the determined set of distances, and
transmitting information related to the determined score via a network.

20. A non-transitory computer readable storage medium having a computer program stored thereon to cause a computer to perform a method for an electronic device, the method comprising:
extracting features from each of a query image acquired in a first modality and a database image acquired in a second modality, wherein the first modality is different from the second modality, the query image is a face image and the database image is a face image having a head pose that is different from a head pose of the query image, and the query image and the database image are not aligned when the features are extracted;
determining, based on a codebook for the first modality, a vector distance distribution for the query image represented by the extracted features and a vector distance distribution for the database image represented by the extracted features;
generating a set of distances between the vector distance distribution determined for the query image and the vector distance distribution determined for the database image;
determining a score for matching the query image and the database image based on the determined set of distances; and
transmitting information related to the determined score to a server to cause the server to match the query image to the database image using the transmitted information and to display matched images to a user of the server.

21. A system comprising:
an image capture device configured to capture a query image using a first modality;
a database having database images captured using a second modality, wherein the first modality is different from the second modality;
a processor; and
a memory, the memory having instructions thereon executable by the processor to perform operations including:
extracting features from each of the query image and one of the database images, wherein the query image is a face image and the database image is a face image having a head pose that is different from a head pose of the query image, and the query image and the database image are not aligned when the features are extracted,
determining, based on a codebook for the first modality, a vector distance distribution for the query image represented by the extracted features and a vector distance distribution for the database image represented by the extracted features, generating a set of distances between the vector distance distribution determined for the query image and the vector distance distribution determined for the database image, determining a score for matching the query image and the database image based on the determined set of distances, and transmitting information related to the determined score to a server to cause the server to match the query image to the database image using the transmitted information and to display matched images to a user of the server.

* * * * *